United States Patent
Manchester et al.

(10) Patent No.: US 6,760,327 B1
(45) Date of Patent: Jul. 6, 2004

(54) RATE ADJUSTABLE BACKPLANE AND METHOD FOR A TELECOMMUNICATIONS NODE

(75) Inventors: Earl B. Manchester, Cotati, CA (US); Barry W. Field, Windsor, CA (US); Kenneth M. Buckland, Santa Rosa, CA (US); Charles R. Dyer, Rohnert, CA (US); Riccardo G. Dorbolo, Petaluma, CA (US); Danny Thom, Santa Rosa, CA (US); Jan C. Hobbel, Cotati, CA (US); Soren B. Pedersen, Petaluma, CA (US); Thomas A. Potter, Petaluma, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/452,829

(22) Filed: Dec. 1, 1999

(51) Int. Cl.[7] .............................................. H04L 12/28
(52) U.S. Cl. ........................ 370/364; 370/252; 370/438
(58) Field of Search ................................ 370/229–232, 370/351–356, 364, 395.1, 395.12, 396, 395.5, 400, 401, 402, 408, 409, 421–423, 464–466, 498

(56) References Cited

U.S. PATENT DOCUMENTS

| | | | | |
|---|---|---|---|---|
| 5,052,029 A | * | 9/1991 | James et al. ................. | 370/509 |
| 5,425,022 A | * | 6/1995 | Clark et al. .................. | 370/360 |
| 5,485,458 A | * | 1/1996 | Oprescu et al. ............. | 370/409 |
| 5,504,757 A | * | 4/1996 | Cook et al. .................. | 370/468 |
| 5,570,362 A | | 10/1996 | Nishimura .................. | 370/60.1 |
| 5,577,039 A | | 11/1996 | Won et al. ................... | 370/60.1 |
| 5,724,348 A | | 3/1998 | Basso et al. ................. | 370/384 |
| 5,734,653 A | | 3/1998 | Hiraiwa et al. ............. | 370/395 |
| 5,812,548 A | | 9/1998 | Havermans et al. ........ | 370/353 |
| 5,848,067 A | | 12/1998 | Osawa et al. ................ | 370/394 |
| 5,943,339 A | | 8/1999 | Mauger ....................... | 370/397 |
| 5,943,344 A | | 8/1999 | Keller et al. ................. | 370/468 |
| 6,243,382 B1 | | 6/2001 | O'Neill et al. ............... | 370/395 |
| 6,396,829 B1 | | 5/2002 | Witschorik .................. | 370/352 |
| 6,396,844 B1 | * | 5/2002 | Mack et al. ................. | 370/420 |
| 6,404,782 B1 | | 6/2002 | Berenbaum et al. ........ | 370/522 |
| 6,430,636 B1 | * | 8/2002 | Cranston et al. ............ | 710/107 |
| 6,442,167 B1 | | 8/2002 | Aramaki et al. ....... | 370/395.43 |

OTHER PUBLICATIONS

ITU–T Recommendation I.363, "B–ISDN ATM Adaptation Layer (AAL) Specification," Mar. 1993, 100 pages.

Bellcore GR–253–Core, "Synchronous Optical Network (SONET) Transport Systems: Common Generic Criteria," Issue 2, Dec. 1995 (with rev. Jan 1999), 788 pages.

ATM Forum, "Circuit Emulation Service Interoperability Specification," Version 2.0; Jan. 1997, AF–VTOA–0078.000, 101 pages.

(List continued on next page.)

*Primary Examiner*—John Pezzlo
*Assistant Examiner*—David Odland
(74) *Attorney, Agent, or Firm*—Baker Botts L.L.P.

(57) ABSTRACT

A rate adjustable backplane includes a set of switch slots configured to receive one or more switch cards forming a switch core and a plurality of line slots each configured to receive a line card. A low speed bus couples the line slots to the set of switch slots. A high speed bus also couples the line slots to the set of switch slots. Each line slot includes a low speed connector coupled to the low speed bus and a high speed connector coupled to the high speed bus. The low speed connector is adapted to receive a mating connector of a line card to establish a low speed communication connection between the line card and the switch core. The high speed connector is adapted to receive a mating connector of the line card to establish a high speed link between the line card and the switch core.

20 Claims, 20 Drawing Sheets

OTHER PUBLICATIONS

ATM Forum, "Specifications of (DBCES) Dynamic Bandwidth Utilization—in 64Kbps Time Slot Trunking over ATM—Using CES," Jul. 1997, AF-VTOA-0085.000, 32 pages.

Bellcore GR-2837, "ATM Virtual Path Ring Functionality in SONET—Generic Criteria,"Feb. 1998, 154 pages.

Power PC, Powerquicc™, MPC860 User's Manual Motorola, ©1996, 1,143 pp., Jul. 1998.

International Telecommunication Union, Series I: Integrated Servicdes Digital Network, "B-ISDN operation and maintenance principles and functions," Feb. 1999, 116 pages.

"About ATM" www.atmforum.com/atmforum/library/notes 1, 2, 3, 4 and 5 printed Aug. 30, 1999, 5 pages.

U.S. patent application Ser. No. 09/390,420, entitled "Method and System for Transmitting Traffic Having Disparate Rate Components," filed Sep. 3, 1999, 30 pages. (0368).

U.S. patent application Ser. No. 09/419,204, entitled "Method and System for Distributed Processing of Traffic in a Telecommunications Node," filed Oct. 15, 1999, 37 pages. (0369).

U.S. patent application Ser. No. 09/607,771, entitled "Method and System for Protection Switching in a Telecommunications Network," filed Jun. 30, 2000, 32 pages. (0388).

U.S. patent application Ser. No. 09/628,532, entitled "Method and System for Reprogramming Instructions for a Switch," filed Jul. 31, 2000, 35 pages. (0370).

U.S. patent application Ser. No. 09/657,068, entitled "Method and System for Processing Traffic in an Access Network," filed Sep. 7, 2000, 41 pages. (0362).

"Asynchronous Transfer Mode (ATM) Switching," printed from www.cisco.com on Aug. 27, 2002, 19 pages.

* cited by examiner

DS0-n VALUE ASSOCIATED WITH $CAS_N$ POSITION TO SN VALUE

| SN | $CAS_A$ | $CAS_B$ | $CAS_C$ | $CAS_D$ | $CAS_E$ | $CAS_F$ |
|---|---|---|---|---|---|---|
| 0 | 0 | 1 | 2 | 3 | 4 | 5 |
| 1 | 3 | 4 | 5 | 6 | 7 | 8 |
| 2 | 6 | 7 | 8 | 9 | 10 | 11 |
| 3 | 9 | 10 | 11 | 12 | 13 | 14 |
| 4 | 12 | 13 | 14 | 15 | 16 | 17 |
| 5 | 15 | 16 | 17 | 18 | 19 | 20 |
| 6 | 18 | 19 | 20 | 21 | 22 | 23 |
| 7 | 21 | 22 | 23 | 24 | 25 | 26 |
| 8 | 24 | 25 | 26 | 27 | 28 | 29 |
| 9 | 27 | 28 | 29 | 30 | 31 | 32 |
| 10 | 30 | 31 | 32 | 33 | 34 | 35 |
| 11 | 33 | 34 | 35 | 36 | 37 | 38 |
| 12 | 36 | 37 | 38 | 39 | 40 | 41 |
| 13 | 39 | 40 | 41 | 42 | 43 | UNDEF |
| 14 | 42 | 43 | UNDEF | 0 | 1 | 2 |
| 15 | 0 | 1 | 2 | 3 | 4 | 5 |

*FIG. 24*
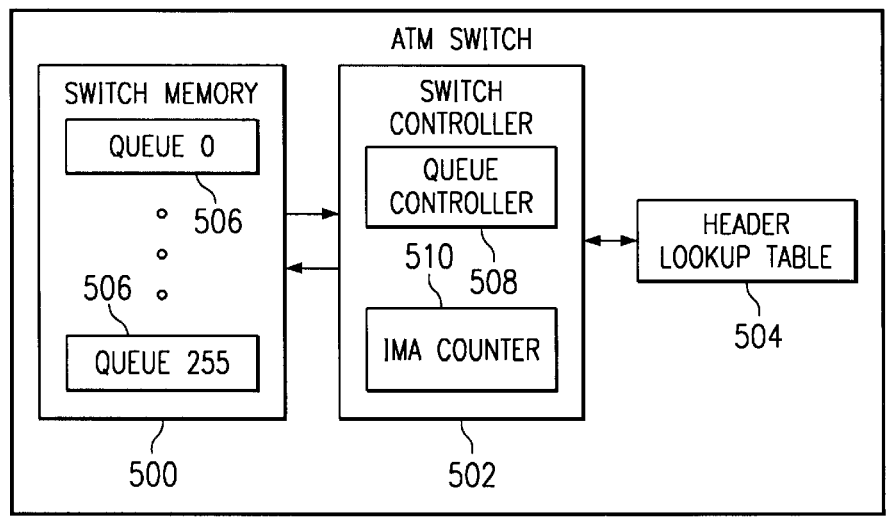
*FIG. 25*
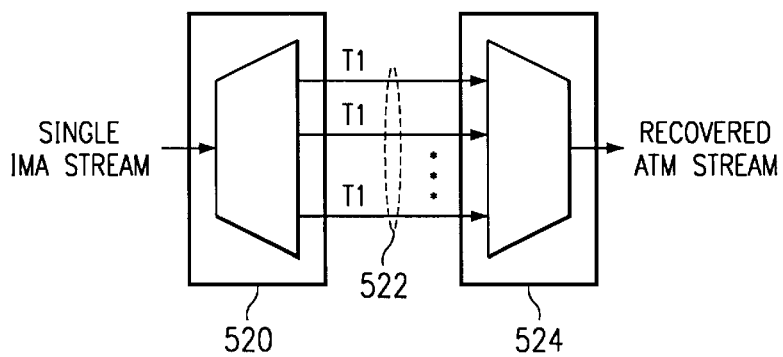
*FIG. 28*
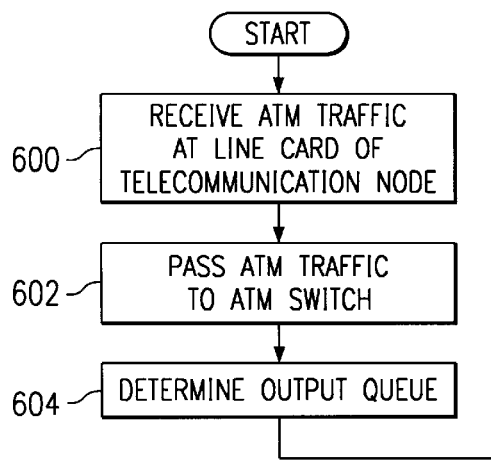
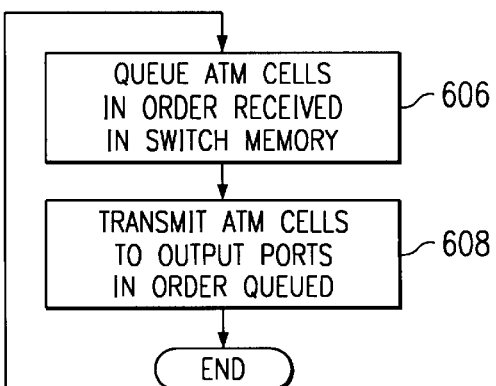

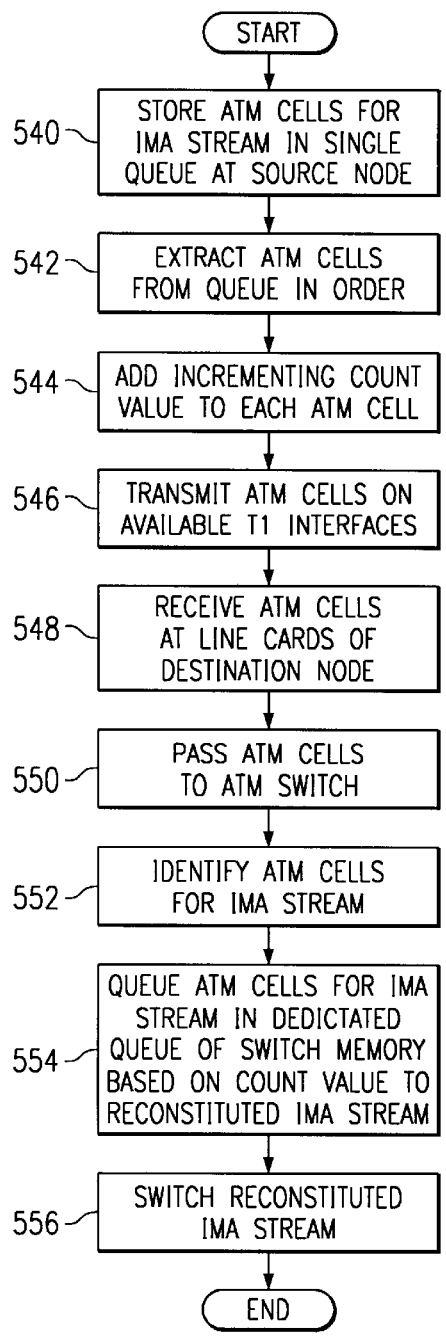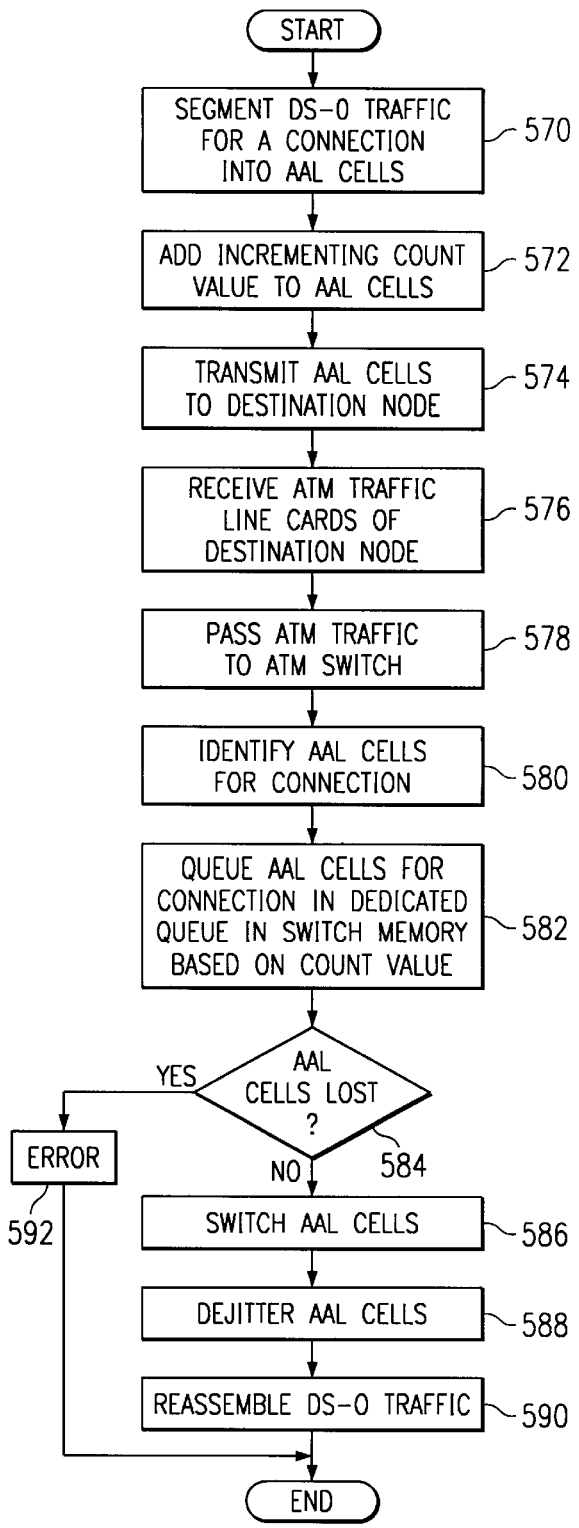

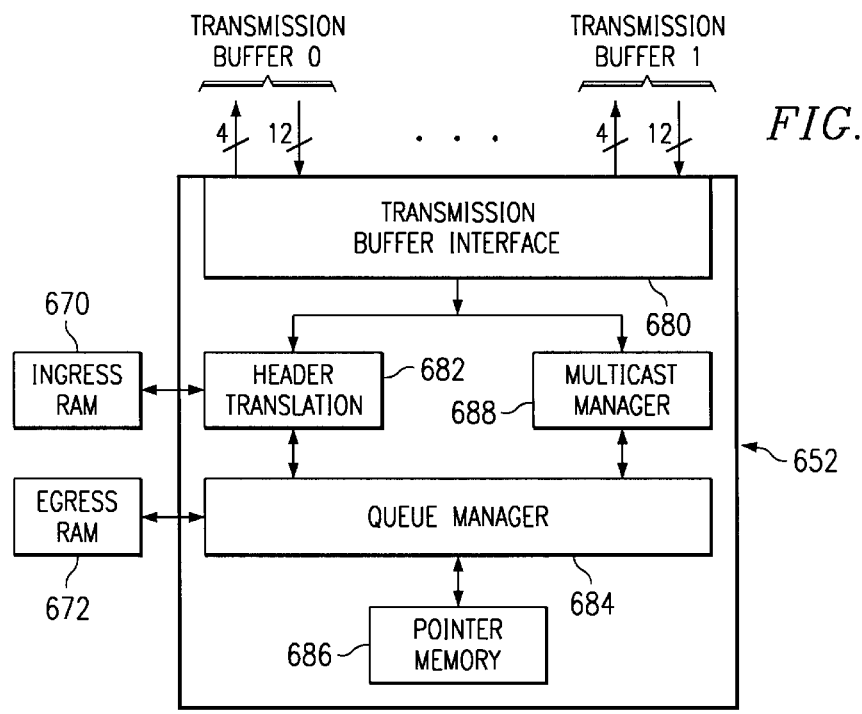
FIG. 30
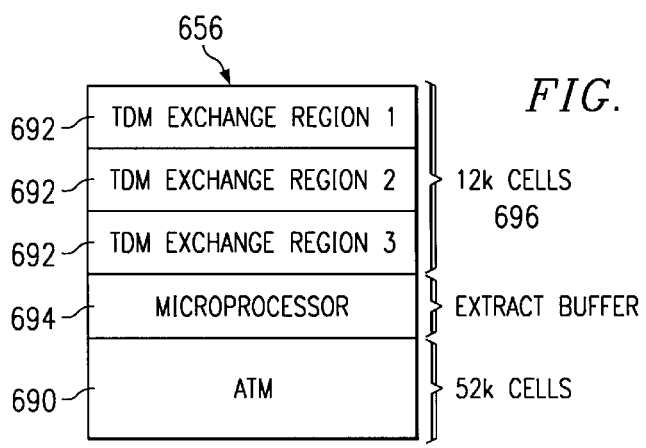
FIG. 31
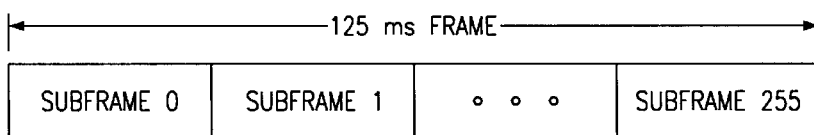
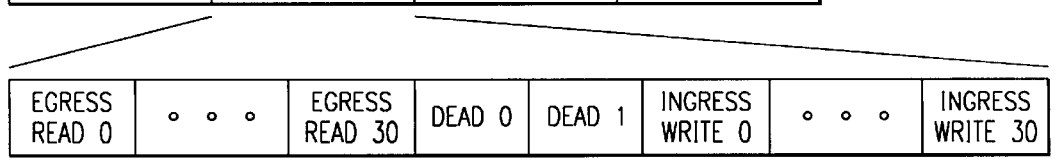
FIG. 32

RATE ADJUSTABLE BACKPLANE AND METHOD FOR A TELECOMMUNICATIONS NODE

RELATED APPLICATIONS

This application is related to copending U.S. patent application Ser. No. 09/452,753, entitled "METHOD AND SYSTEM FOR TRANSPORTING SYNCHRONOUS AND ASYNCHRONOUS TRAFFIC ON A SYNCHRONOUS BUS OF A TELECOMMUNICATIONS NODE;" U.S. patent application Ser. No. 09/452,759, entitled "FUSED SWITCH CORE AND METHOD FOR A TELECOMMUNICATIONS NODE;" U.S. patent application Ser. No. 09/452,746, entitled "METHOD AND SYSTEM FOR TRANSPORTING SYNCHRONOUS AND ASYNCHRONOUS TRAFFIC ON A BUS OF A TELECOMMUNICATIONS NODE;" U.S. patent application Ser. No. 09/452,830, entitled "ASYNCHRONOUS TRANSFER MODE (ATM) SWITCH AND METHOD FOR A TELECOMMUNICATIONS NODE;" U.S. patent application Ser. No. 09/452,751, entitled "SYNCHRONOUS SWITCH AND METHOD FOR A TELECOMMUNICATIONS NODE;" and U.S. patent application Ser. No. 09/452,828, entitled "TIME SLOT INTERCHANGER (TSI) AND METHOD FOR A TELECOMMUNICATIONS NODE".

TECHNICAL FIELD OF THE INVENTION

This invention relates generally to the field of telecommunications, and more particularly to a rate adjustable backplane and method for a telecommunications node.

BACKGROUND OF THE INVENTION

The Internet has dramatically increased the potential for data, voice, and video services for customers. Existing circuit-switch telephony systems, however, do not provide the foundation to support the growing need for bandwidth and new services required by both residential and business consumers. As a result, integrated access devices have been introduced to support Internet and related technologies as well as standard telephony service.

Integrated access devices are typically implemented in a card shelf configuration with functionality of the device distributed between discrete line and switch cards connected over a backplane. The line cards provide the service interfaces for the different traffic types and accordingly operate at different rates. For example, a line card providing a plain old telephone service (POTS) interface operates at low speeds on the order of 64 Megabits per second (Mb/s) while a line card for a synchronous optical network (SONET) link, such as a OC-48 link, operates at high speed on the order of 2.5 Gigabits per second (Gb/s).

To support line cards of different rates, backplanes are typically designed to support a full array of high speed line cards. This allows high and low speed line cards to be used in every slot of the integrated access device. Circuitry on the backplane to support the high speed cards, however, can be prohibitively expensive for many low-cost applications in which access devices are utilized. Moreover, while devices with backplanes designed to support only low speed cards can be utilized in these applications, such devices cannot be later upgraded to support high speed interfaces.

SUMMARY OF THE INVENTION

The present invention provides a rate adjustable backplane and method for a telecommunications node that substantially eliminates and reduces disadvantageous and problems associated with previous systems and methods. In particular, the backplane includes a low speed bus that terminates at a multiple format switch card and a high speed bus that terminates at an optional high capacity switch card. Circuitry for implementing a high speed communication connection is provided on high speed line cards and the high capacity switch card in order to support low speed applications at low cost and to allow upgrades to higher capacity applications.

In accordance with one embodiment of the present invention, a rate adjustable backplane includes a set of switch slots configured to receive one or more switch cards forming a switch core and a plurality of line slots each configured to receive a line card. A low speed bus couples the line slots to the set of switch slots. A high speed bus also couples the line slots to the set of switch slots. Each line slot includes a low speed connector coupled to the low speed bus and a high speed connector coupled to the high speed bus. The low speed connector is adapted to receive a mating connector of a line card to establish a low speed communication connection between the line card and the switch core. The high speed connector is adapted to receive a mating connector of a line card to establish a high speed communication connection between the line card and the switch core.

More specifically, in accordance with a particular embodiment of the present invention, the set of switch slots includes a first switch slot adapted to receive a low capacity switch card and a second switch slot adapted to receive a high capacity switch card. A unibus couples the first and second switch slots together. In this and other embodiments, the low speed bus may comprise a time division multiplex (TDM) bus and the high speed bus may comprise an asynchronous transfer mode (ATM) bus. ATM cells may be transported in asynchronously fixed, synchronous or other suitable cell slots.

In accordance with another aspect of the present invention, a high speed communication connection is established between a line card and a switch core over a backplane of a telecommunications node by establishing a communication connection between the line card and the switch core over a low speed bus operating at a predefined rate. A high speed rate at which to operate a point-to-point link of a high speed bus coupling the line card to the switch core is determined. The high speed bus is then operated at the defined rate to communicate traffic between the line card and the switch core.

Technical advantages of the present invention include providing an improved backplane for a telecommunications node. In particular, the backplane is rate adjustable to support low capacity applications at low cost and ungradable with the addition of high speed line cards and a high capacity switch card to support high capacity applications. As a result, system costs are more directly proportional to functionality which allows low-cost solutions for low-rate and other limited applications.

Another technical advantage of the present invention includes providing a distributed bus architecture for a backplane of a telecommunications node. In particular, a low speed TDM bus and a high speed ATM bus are provided between each line card and a switch core. The low speed bus and the high speed bus each include point-to-point links between the line cards and the switch core to provide signal robustness and allow each high speed link to operate at a different rate. High speed line cards use the low speed telephony subscriber bus as a data link to establish a rate with which to communicate service traffic with the switch core over the high speed bus. Thus, the backplane provides a robust communication structure, supports high and low speed line cards in each slot of the telecommunication node to maximize flexibility, and allows high speed line cards to set the rate of their connection to the switch core.

Other technical advantageous of the present invention will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 24 is a block diagram illustrating details of the multi-purpose ATM switch of FIG. 17 in accordance with one embodiment of the present invention;

FIG. 25 is a block diagram illustrating inverse multiplexing ATM (IMA) transmission of a traffic stream in accordance with one embodiment of the present invention;

FIG. 26 is a flow diagram illustrating a method for transmitting and processing IMA traffic at the multi-purpose ATM switch of FIG. 24 in accordance with one embodiment of the present invention;

FIG. 27 is a flow diagram illustrating a method for transmitting and processing ATM adaptation layer (AAL) traffic at the multi-purpose ATM switch of FIG. 24 in accordance with one embodiment of the present invention;

FIG. 28 is a flow diagram illustrating a method for receiving and processing ATM cells at the multi-purpose ATM switch of FIG. 24 in accordance with one embodiment of the present invention;

FIG. 30 is a blocked diagram illustrating details of the controller of FIG. 29 in accordance with one embodiment of the present invention;

FIG. 31 is a block diagram illustrating details of the switching memory of FIG. 29 in accordance with one embodiment of the present invention;

FIG. 32 is a block diagram illustrating synchronized read and write operations of the high capacity ATM switch of FIG. 29 in accordance with one embodiment of the present invention;

DETAILED DESCRIPTION OF THE INVENTION

Figure 1:
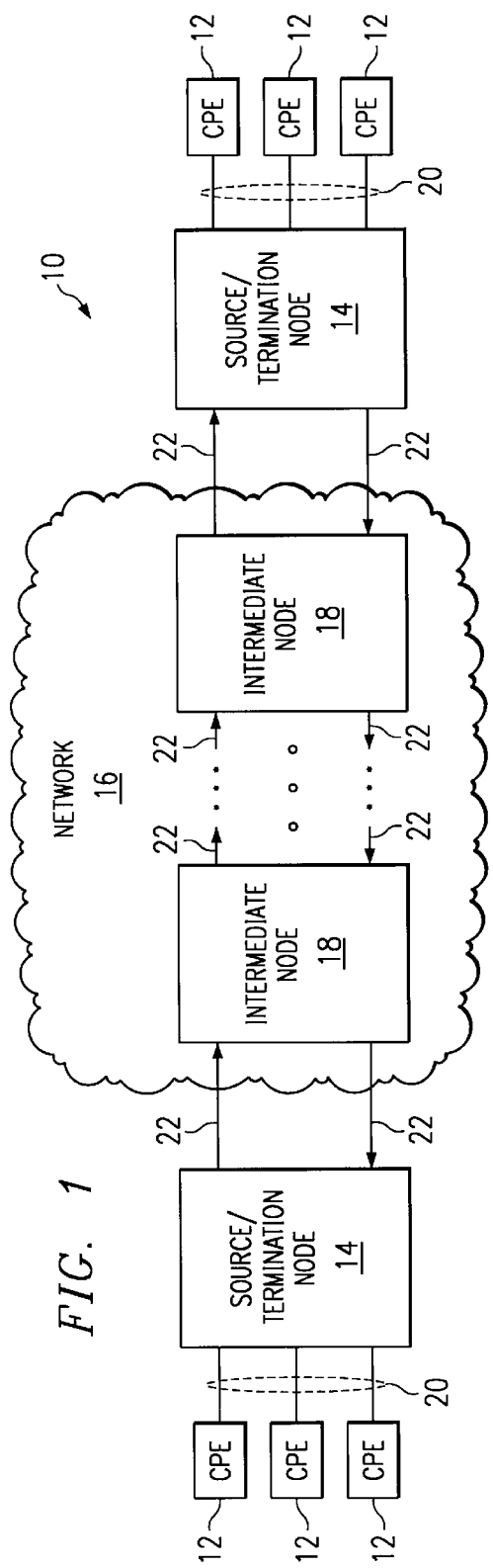
FIG. 1 is a block diagram illustrating a telecommunications system in accordance with one embodiment of the present invention.

FIG. 1 illustrates a telecommunications system 10 in accordance with one embodiment of the present invention. The telecommunications system 10 transmits voice, data, video, other suitable types of information, and/or a combination of different types of information between source and destination points.

Referring to FIG. 1, the telecommunications system 10 includes customer premise equipment (CPE) 12 and integrated access devices (IADs) 14 connecting the customer premise equipment 12 to a network 16. The network 16 may include portions of the Internet, one or more intranets, other wide or local area networks, and the like. In a particular embodiment, the network 16 includes backbone routers at its borders for communicating with the integrated access devices 14. In this embodiment, the integrated access devices 14 may be Cisco 6732 integrated access devices and the backbone routers may be Cisco 12000 routers. It will be understood that different types of integrated access devices and backbone routers as well as different types of devices capable of directing, switching or otherwise routing traffic may be used in connection with the present invention.

The customer premise equipment 12 includes standard telephones, modems, computers, dataphones and other devices capable of generating traffic for transmission in the telecommunications system 10. The customer premise equipment 12 is connected to the integrated access devices 14 through a communication link 20. The communication link 20 may be a T1 line, conventional twisted pair cable, fiber optic, or other suitable type of wireline or wireless link.

The integrated access devices 14 communicate voice, data, and/or video traffic between the customer premise equipment 12 and the network 16. Ingress traffic from the customer premise equipment 12 is segmented into asynchronous transport mode (ATM) or other suitable format by the integrated access devices 14 for high-speed transmission to and within the network 16. Ingress traffic from the network 16 is reassembled from the ATM format into its native format for delivery to the customer premise equipment 12.

ATM is a connection-oriented technology in which traffic is organized into small, fixed length cells. Each ATM cell includes an address tag that defines a connection between source and termination nodes. For the embodiment of FIG. 1, the integrated access devices 14 are source/termination nodes and the backbone routers 18 are intermediate nodes for a connection 22 spanning across a telecommunications system 10.

Figure 2:
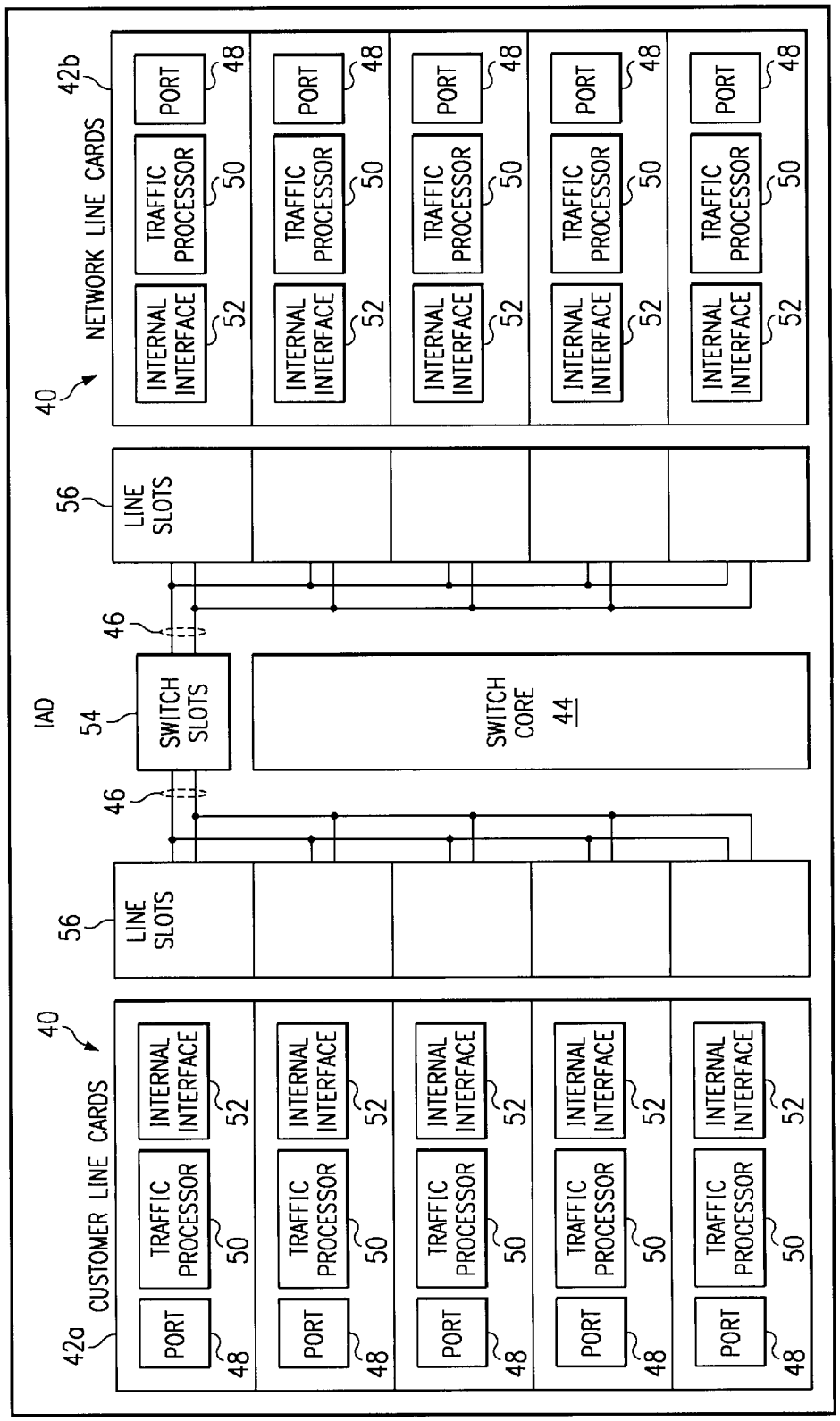
FIG. 2 is a block diagram illustrating a detailed view of a node in the telecommunication system of FIG. 1 in accordance with one embodiment of the present invention.

FIG. 2 illustrates details of the integrated access device 14 in accordance with one embodiment of the present invention. In this embodiment, the integrated access device 14 is implemented in a card shelf configuration with functionality of the device distributed between discrete cards connected over a backplane. The backplane includes one or more transmission busses connecting line cards and switch cards. It will be understood that other types of access devices and/or nodes may be used in connection with the present invention.

Referring to FIG. 2, the integrated access device 14 includes line cards 40, a switch core 44, and a rate adjustable backplane 46. The line cards 40 and switch cards of the switch core 44 each include hardware and software stored in RAM, ROM, and/or other suitable computer readable medium for performing switch and other functionality of the cards. The line cards 40 are each a discrete card configured to plug into the rate adjustable backplane 46. As used herein, each means every one of at least a subset of the identified items. The switch core 44 comprises one or more discrete switch cards also configured to plug into the rate adjustable backplane 46. As described in more detail below, the rate adjustable backplane 46 includes a low speed synchronous bus and a high speed bus each capable of communicating synchronous and asynchronous service traffic, control data, and other information between the line cards 40 and the switch core 44. Synchronous traffic includes time division multiplex (TDM) traffic such as telephony voice (DS-0), synchronous transmission signal (STS-N) traffic, integrated services digital network (ISDN) traffic, synchronous optical network (SONET) traffic, synchronous digital hierarchy (SDH) traffic and other suitable types of traffic in which routing information is derived from the position of the traffic in a frame. Asynchronous traffic includes ATM traffic, data grams such as frame and packet based traffic, and other suitable traffic in which routing information is transported with the traffic. In a particular embodiment, the low speed synchronous bus is a TDM bus and the high speed bus is a synchronous bus adapted to optimize transport of ATM traffic and thus forms an ATM bus.

The line cards 40 includes customer line cards 42a and network line cards 42b that communicate traffic with the network 16. Each line card 40 includes one or more external interfaces, or ports, 48, one or more internal interfaces 50, and a traffic processor 52. The ports 48 receive ingress traffic from an external line and/or transmit egress traffic received by the internal interfaces 50 from the switch core 44. The internal interfaces 50 transmit ingress traffic received by the ports 48 from the external links and received egress traffic from the switch core 44. The internal interfaces 50 communicate with the switch core 44 over the low speed TSB and/or the high speed ATM bus. The traffic processor 52 is preferably local to the line card 40 and includes hardware and software or processing DS-0, STS-N, ISDN, ATM, and/or other suitable traffic.

The switch core 44 performs synchronous based switching such as TDM switching and cell based switching based on a synchronized frame pulse. TDM based switching provides time slot interchange for telephony connections, SONET SPEs, other synchronized traffic, and asynchronous traffic segmented into time slots. The cell based switching switches ATM cell traffic, ATM adaption layer (AAL) cell traffic, and segmented packet traffic on a frame-based schedule. As described in more detail below, the switch core 44 may also convert traffic between the TDM and ATM realms to establish cross connections between the line cards 40.

In operation, the integrated access device 14 may be deployed with STS-1 line cards, OC-3 line cards, OC-12 line cards, Ethernet/Internet protocol (IP) line cards, and voice over IP line cards. The ATM line cards 40 perform header translation by identifying the coming virtual path identifier (VPI)/virtual channel identifier (VCI) in cells and replacing the VPI/VCI with a cell connection identifier (CID). The ATM line cards 40 also perform ATM layer function such as processing operation, administration, and management (OAM) cells and perform monitoring functions. Packet based line cards 40 segment and resemble (SAR) packets into generic ATM cells. Ethernet line cards 40 examine source address (SA) and destination address (DA) of the ethernet packets in order to map the packet flow into a cell flow. As with ATM traffic, the segment cells are labeled to a CID. Cells from the switch core 44 are reassembled into a packet based on the cell's CID. The AAL5 protocol or a close variant may be used to SAR the packets. TDM line cards such as STS-1 or DS1 produce and receive a continuous and deterministic set of cells on a frame based schedule.

The switch core receives and processes the TDM and ATM traffic using TDM based switching and ATM cell based switching. In switching service traffic received from the line cards 40, the switch core 44 performs queue management as well as broadcast and multicast operations. It would be understood that the line cards 40 and switch core 44 may each perform additional or different functions. It will be further understood that identified functions of the line cards 40 and the switch core 44 may be suitably off loaded to the other.

The rate adjustable backplane 46 includes a set of switch slots 54 and a plurality of line slots 56. The set of switch slots 54 include one or more receptors for receiving one or more switch cards forming the switch core 44. In one embodiment, the set of switch slots 54 include a first switch slot configured to receive a multiple format standard switch card and a second switch slot configured to receive an optional high capacity switch card. In this embodiment, the first switch slot includes both a low speed and high speed connector to connect the standard switch card to the low speed TDM bus and the high speed ATM bus while the second switch slot includes only a high speed connector to connect the high capacity switch card to the high speed ATM bus. The switch core 44 may include only the standard switch card in low speed applications and may be upgraded to also include the high capacity switch card for high-speed applications. Alternatively, the set of switch slots 54 could include a single switch slot adapted to receive the standard switch card for low speed applications and to receive a replacement high capacity switch card for high-speed applications.

The line slots 56 each include a receptor adapted to receive a line card 40. In one embodiment, the receptor further includes a low-speed connector and a high-speed connector. The low speed connector is adapted to receive a mating connector of a line card 40 to establish a low-speed link between the line card 40 and the switch core 44. The high-speed connector is adapted to receive a mating connector of the line card 40 to establish a high-speed link between line card 40 and the switch core 44. Thus, each line card 40 may include a low-speed and/or a high-speed connector for communicating with the switch core 44 over the low and/or high speed busses of the backplane 46. In one embodiment, the high-speed rates are predefined for each line slot 56 and may vary between the line slots 56. In another embodiment, the rate of one or more high-speed links may be individually set by each line card through communications with the switch core 44 over the low-speed link. Thus, flexibility in the type of line card 40 supported by the integrated access device 14 is maximized.

Figure 3:
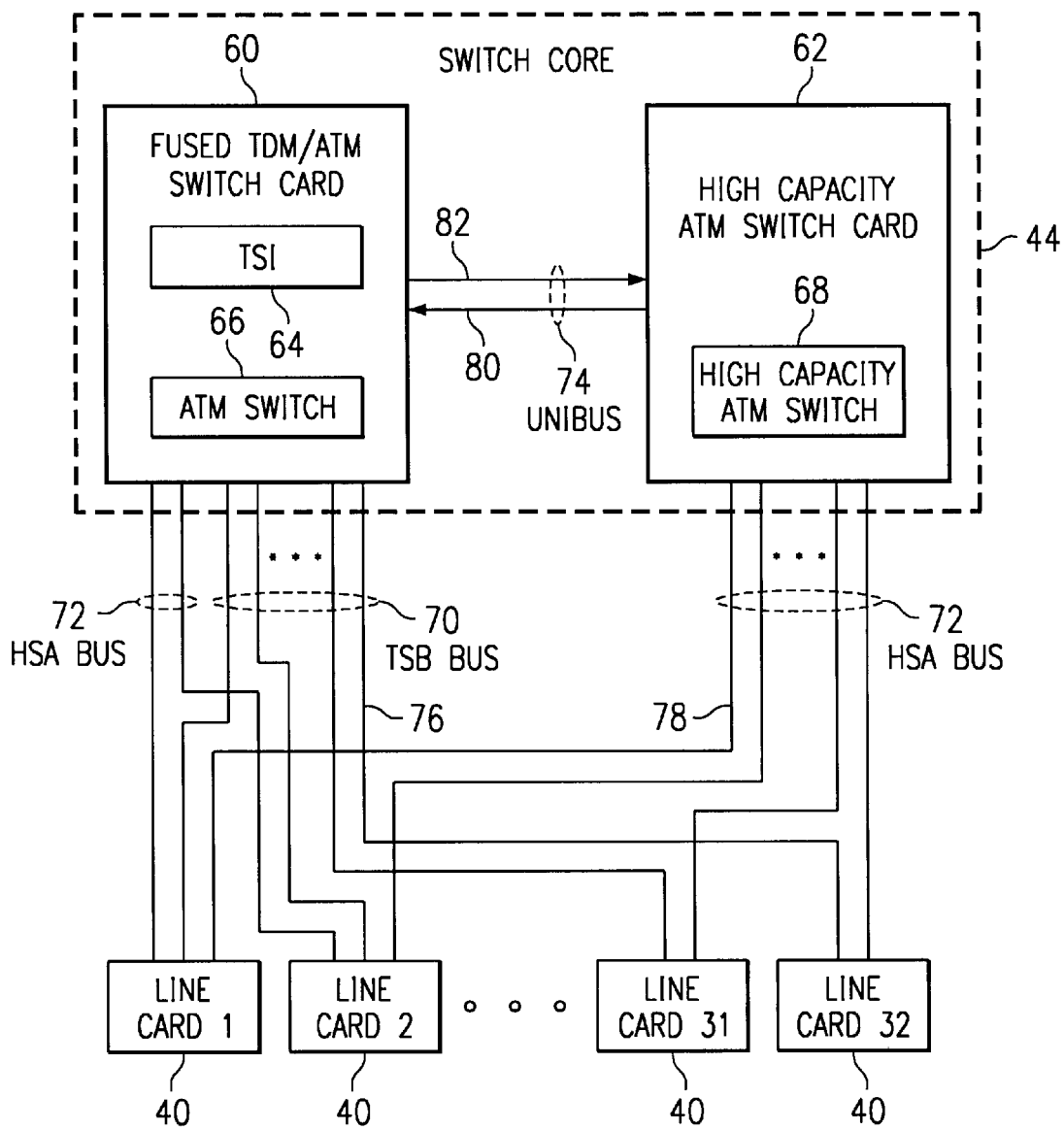
FIG. 3 is a block diagram illustrating communication busses, switch cards and line cards of the node of FIG. 2 in accordance with one embodiment of the present invention.

FIG. 3 illustrates details of the switch core 44 and the rate adjustable backplane 46 of the integrated access device 14 in accordance with one embodiment of the present invention. In this embodiment, switch functionality in the switch core 44 is distributed between a standard switch card and an optional high-capacity switch card that are both connectable to each of the line cards 40 over the rate adjustable backplane 46. The standard switch card switches both synchronous and asynchronous traffic in low rate and other limited applications. The high-capacity switch card can be added to the integrated access device 14 and used in conjunction with the standard switch card for high-speed applications. In this way, the integrated access device 14 provides a scalable architecture with system costs that are proportional to functionality.

Referring to FIG. 3, the switch core 44 includes a fused TDM/ATM switch card 60 and a high capacity ATM switch card 62. The fused TDM/ATM switch card 60 includes a time slot interchanger (TSI) 64 and a multi-purpose ATM switch 66 that are together capable of switching both synchronous and asynchronous traffic. Accordingly, the integrated access device 14 may be deployed with only the fused TDM/ATM switch card 60. The high capacity ATM switch card 62 includes a high capacity ATM switch 68 and may be added to the switch core 44 for high volume applications. Further details regarding the structure and operation of the fused TDM/ATM switch card 60 and the high capacity ATM switch card 62 are provided below in connection with FIGS. 17–34.

The rate adjustable backplane 46 is separated into a low-speed TDM bus 70 and a high-speed ATM bus 72. The low-speed bus is low speed in that it transports traffic at a slower rate than the high speed bus. Typically, the low speed bus operates at rates around or below 50–100 Mb/s. The high speed bus operates at rates around or above 200 Mb/s to 1 Gb/s. In addition, a unibus 74 is provided between the fused TDM/ATM switch card 60 and the high capacity ATM switch card 62. The TDM bus 70 operates at around 30 Megabits per second (Mb/s) and is typically used to transport voice traffic from line cards 40 having plain old telephone service (POTS), T1, DS-3 and other telephony service interfaces to the switch core 44. The ATM bus 72 operates at high speeds in the order of Gigabits per second (Gb/s) and is typically used to transport cell traffic from line cards 40 having T1, DS-3 UNI, OC-3 C UNI, other ATM interfaces, and other asynchronous interfaces to the switch core 44. The unibus 74 also operates at high speeds in the order of Gb/s and transports traffic between the fused TDM/ATM switch card 60 and the high capacity ATM switch card 62. The low-speed TDM bus 70, the high-speed ATM bus 72, and the unibus 74 each operate synchronously and transport both synchronous and asynchronous traffic between components in the integrated access device 14.

In one embodiment, the TDM bus 70 comprises a TDM subscriber bus (TSB). In this embodiment, the TSB bus 70 comprises a full-duplex, point-to-point serial link 76 between each line card 40 and the fused TDM/ATM switch card 60. The point-to-point serial bus-configuration increases signal robustness as new line cards 40 are not inserted into an operating bus. It will be understood, however, that the TSB bus 70 may be implemented with a shared bus design.

Each point-to-point serial link 76 of the TSB bus 70 includes a single data signal to minimize pin usage, a frame indicator signal, and an associated clock signal in each direction. Alternatively, the data signal can be demultiplexed into eight or another suitable number of signal lines to reduce bus speed in exchange for more signal lines and connector pins on the circuit cards. As described in more detail below, each point-to-point serial link 76 of the TSB bus 70 has a frame structure that repeats at a 125 microsecond interval, which corresponds to the frame period that is ubiquitous to the telephony line cards 40. In this embodiment, the frame indicator signal pulses high (or low) once every 125 microseconds to indicate the exact start of the 125 microsecond frame.

In one embodiment, the ATM bus 72 comprises a high-speed ATM (HSA) bus. The HSA bus 72 comprises a full-duplex, point-to-point link 78 between each line card 40 and the high capacity ATM switch card 62. The point-to-point bus configuration provides signal robustness and also allows the line cards 40 to communicate with the switch core 44 over the HSA bus 72 at disparate rates. In this embodiment, the unibus 74 also forms an HSA bus to facilitate the exchange of traffic with the line card HSA bus 72. The HSA bus 72 may also connect a limited set of line cards 40 to the fused TDM/ATM switch card 60. This provides a more scalable architecture and allows the integrated access device 14 to provide limited high speed ATM functionality without the need for the high capacity ATM switch card 62.

As described in more detail below, the point-to-point links 78 of the HSA bus 72 may operate at disparate rates. In one embodiment, the lower speed links 78 each provide a four (4) bit wide parallel interface while the higher speed links 78 provide single differential signals. In this embodiment, the clock is recovered from the data stream. In another embodiment, the data signal may be a single data signal in order to reduce pin usage. Alternatively, the data signal can be demultiplexed into eight or other suitable number of signal lines to reduce the bus speed without reduction in data throughput in exchange for more signal lines and connector pins on the various circuit cards. As described in more detail below, the HSA bus 72 includes a 125 microsecond frame structure in order to transport both TDM and STS-N traffic in addition to ATM traffic.

In a particular embodiment, the HSA bus 72 comprises 28 lower speed point-to-point serial links 78 and four higher speed point-to-point serial links 78 with the high capacity ATM switch card 62. In this embodiment, the lower speed HSA links 78 may operate at a rate of 64 cells per frame while the higher speed HSA links 78 operate at a rate of 256 cells per frame. In this embodiment, the unibus 74 also operates at 256 cells per frame. The higher speed HSA links 78 allow four of the thirty-two line cards slots to have OC-12 line cards that operate at about 868 Megabits per second (Mb/s). The remaining twenty-eight line cards slots support OC-3 line cards or other physical interfaces with rates up to about 217 Megabits per second (Mb/s).

The unibus 74 is used universally and uniformly to transport both TDM and ATM traffic between the fused TDM/ATM switch card 60 and the high-capacity ATM switch card 62 and between components of those cards. In one embodiment, the unibus 74 includes an ingress link 80 and an egress link 82. The ingress and egress links 80 and 82 each include 32 signal lines and an associated clock signal. The ingress link 80 transports traffic from the high capacity ATM switch card 62 to the fused TDM/ATM switch card 60. The egress link 82 transports traffic from the fused TDM/ATM switch card 60 to the high capacity ATM switch card 62. Preferably, the unibus 74 has a 125 microsecond frame structure corresponding to that of the TSB and HSA busses 70 and 72.

As described above, the TSB bus 70 and HSA bus 72 terminate separately on the fused TDM/ATM switch card 60 and the high capacity switch cards 62, respectively. This allows the integrated access device 14 to be deployed in low capacity applications without the high capacity ATM switch card 62. For example, if the integrated access device 14 is being utilized to support TDM interfaces and a small number of data interfaces, the fused TDM/ATM switch card 60 can alone handle the load. Because there are no or only a few high speed line connections present, along with the absence of the high capacity ATM switch card 62, there is no or little HSA bus 72 termination circuitry in the integrated access device 14. As a result, the integrated access device 14 is relatively inexpensive and scalable for low speed applications.

For deployment with high speed line cards 40, the high capacity ATM switch card 62 can be inserted into the access device 14 to provide HSA backplane interfaces. Traffic between the high speed line cards 40 and the low speed line cards 40 is accommodated by the unibus 74. Because the TSB and HSA bus formats each support TDM and ATM traffic, TDM traffic may be switched through the high capacity ATM switch card 62 to the TDM portion of the fused TDM/ATM switch card 60. It is also possible to transport ATM traffic from a low speed line card 40 over the TSB bus 70 to the fused TDM/ATM switch card 60, and then to the high capacity ATM switch card 62. In this way, no traffic flows are restricted and maximum flexibility is provided on the backplane 46.

The TSB and HSA buses 70 and 72 are protected by dual termination at two sets of fused TDM/ATM switch cards 60 and high capacity ATM switch cards 62. Each set of switch cards 60 and 62 include a unibus 74 extending between the set of cards. The protect set of switch cards 60 and 62 receives traffic in the protect mode from the TSB and HSA buses 70 and 72. If either of the active switch cards 60 or 62 fail, both of the cards are taken out of service and the protect set of switch cards is activated to perform necessary switching functionality.

Figure 4:
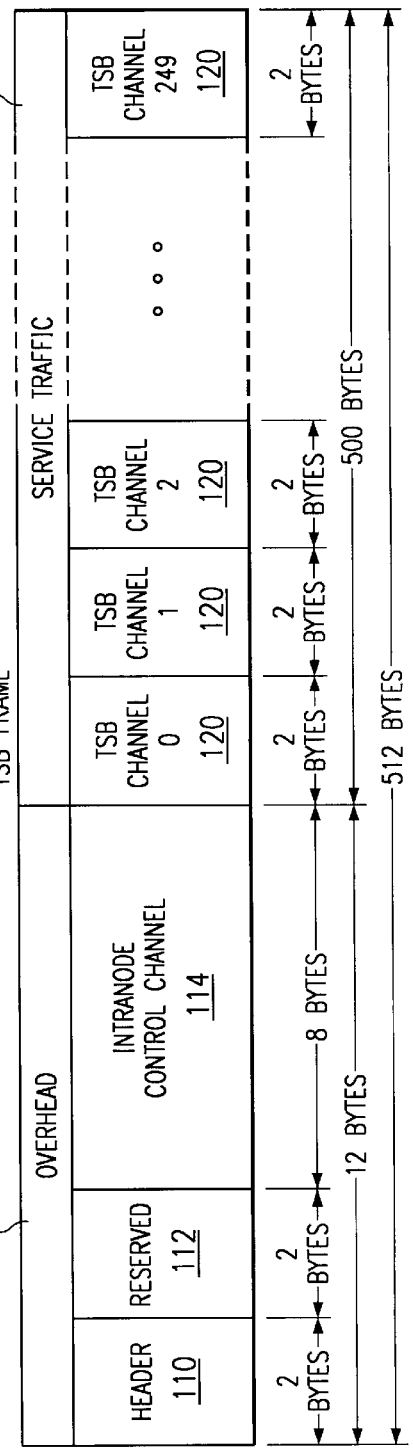
FIG. 4 is a block diagram illustrating a frame structure for the time division multiplex (TDM) subscriber bus (TSB) of FIG. 3 in accordance with one embodiment of the present invention.

FIG. 4 illustrates a bus format for the TSB bus 70 in accordance with one embodiment of the present invention. In this embodiment, each point-to-point link 76 of the TSB bus 70 includes a 125 microsecond frame structure. Accordingly, each byte within the frame structure repeats every 125 microseconds and corresponds to a DS-0 channel operating at 64 bits per second (b/s).

Referring to FIG. 4, a TSB frame 100 is 512 bytes in size. A byte number for the TSB frame 100 that is a power of two is preferred to allow ease of implementation using binary logic. The 512 byte length, which is a power of two, allows eight European telephony (E1) interfaces to be supported on a single line card 40, which is generally considered the maximum number of interfaces that should be allowed to fail at once if a single line card 40 fails. Because E1 is the fastest interface to which the failure group size of eight would generally apply, the TSB bus 70 can support virtually any telephony line card 40. It will be understood that the TSB frame 100 may be otherwise suitably sized.

The TSB frame 100 includes an overhead portion 102 and a service traffic portion 104. The overhead portion 102 transports a variety of control and management information between the line cards 40 and the switch core 44. In a particular embodiment, the overhead portion 102 includes a two byte header 110, two bytes of reserve space 112, and an eight byte intranode communication channel 114.

The header 110 identifies the start of the TSB frame 100. The intranode control communication 114 carries one or more control messages generated by a card transmitting the TSB frame 100 and destined for a remote card or other element in the integrated access device 14. The control messages include line card 40 reset signals, line card 40 enable signals, line card 40 service request signals, line card 40 present indication signals, and other suitable signals concerning the operation and/or status of a card or element of a card. In a particular embodiment, a DS-0 format is used for the control message. In this embodiment, a hex 69 is used to identify the message as a message for a processor. The identifier field is followed by a length field indicating the length of the message, which is followed by the message. It will be understood that control messages may be otherwise suitably formatted for transmission within the internode communication channel 114 in accordance with the present invention.

The control messages are switched by the TSI 64 in the fused TDM/ATM switch card 60 based on their position in the intranode communication channel 114. Thus, the destination device for a message is predefined by provisioning the TSI 64 and each card may transmit control messages to other cards by placing the control message in a slot associated with the destination card. In this way, arbitrary control and communication paths can be established at any time between cards in the integrated access device 14 by simply reprovisioning the TSI 64 in the fused TDM/ATM switch card 60. For example, a group of cards may intercommunicate by a first card sending a message to a second card, the second card processing and forwarding a corresponding message to a third card, the third card processing and forwarding a corresponding message to the fourth card, and the fourth card processing and forwarding a corresponding message to the first card. Moreover, a protection control card that receives all card-to-card traffic can dispatch such traffic to other cards. Further details regarding the process for routing intranode communication and control traffic between cards, processors and other suitable elements are provided below in connection with FIG. 8.

The service traffic portion 104 of the TSB frame 100 is 500 bytes in length and includes 250 two-byte TSB channels, or other service channels, 120. As described in more detail below, each TSB channel 120 may transport traffic for a single DS-0 connection or may be used as part of a set of TSB channels to carry ISDN or ATM traffic. As a result, the TSB frame 100 may interleave different types of traffic and thereby support a line card 40 with disparate types of service interfaces.

Figure 5:
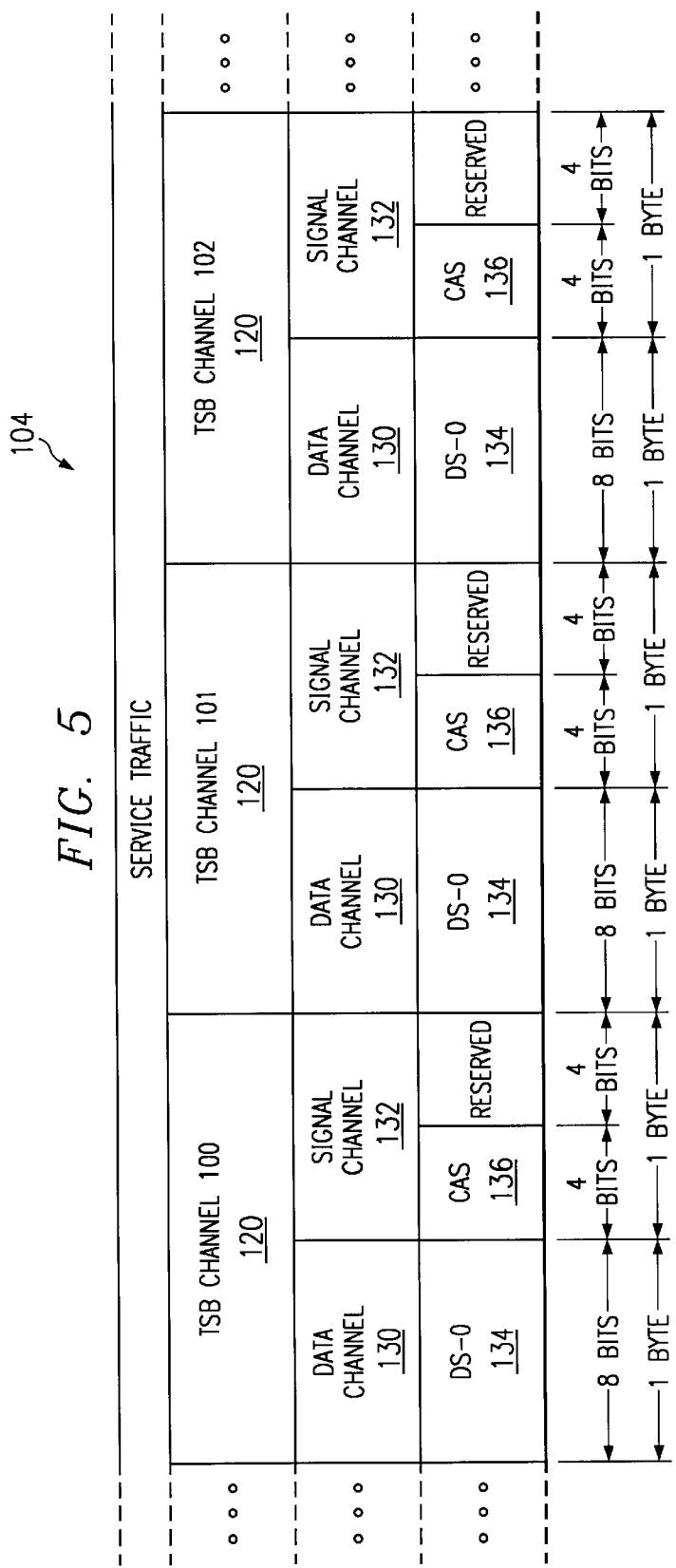
FIG. 5 is a block diagram illustrating transport of telephony, voice (DS-0) traffic in the TSB frame of FIG. 4 in accordance with one embodiment of the present invention.
Figure 6:
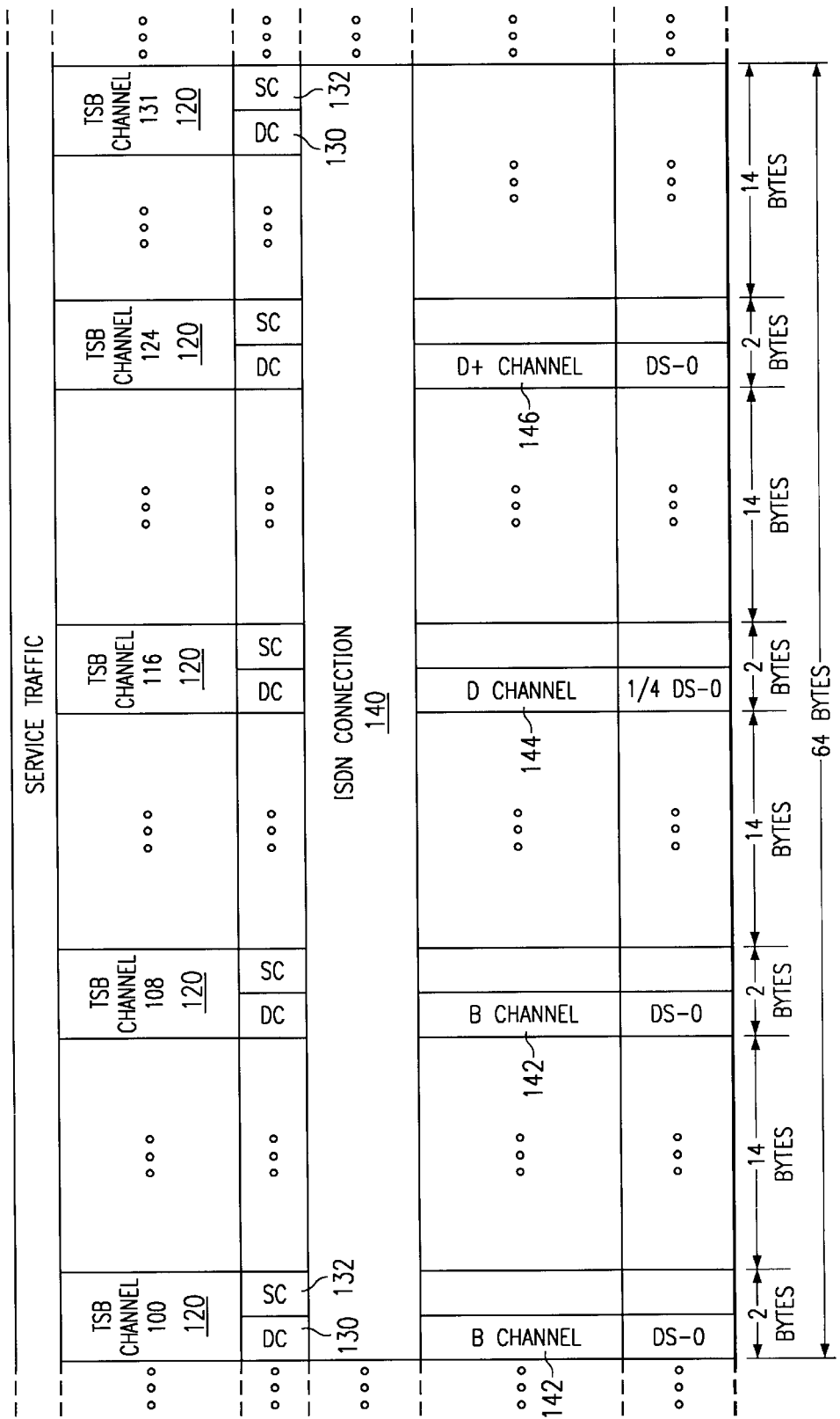
FIG. 6 is a block diagram illustrating transport of integrated services digital network (ISDN) traffic in the TSB frame of FIG. 4 in accordance with one embodiment of the present invention.
Figure 7:
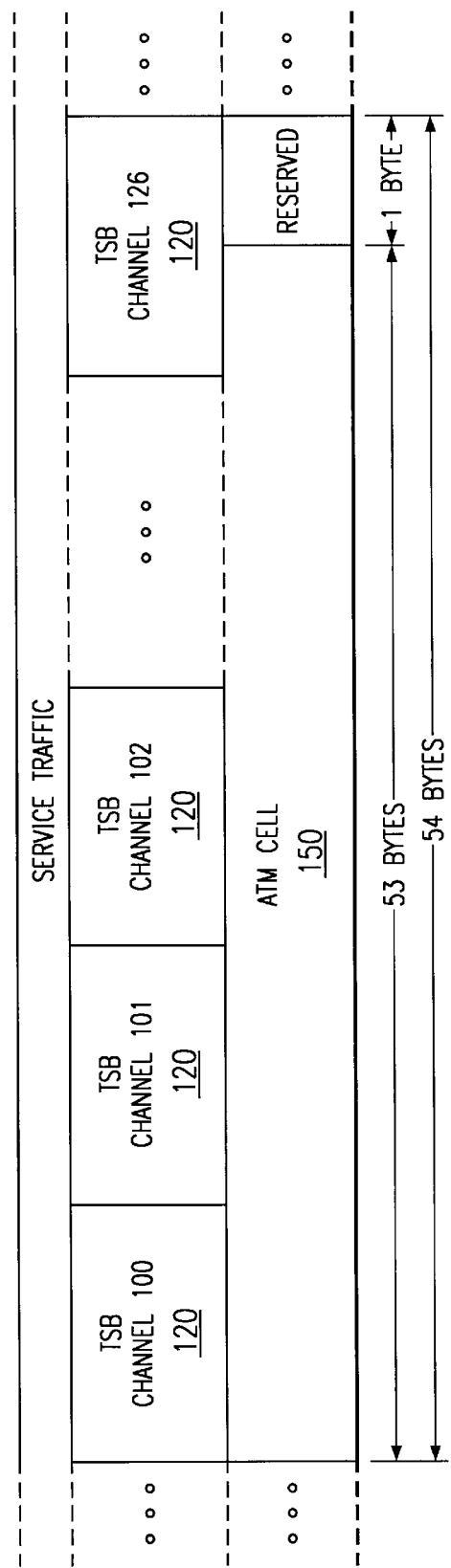
FIG. 7 is a block diagram illustrating transport of asynchronous transfer mode (ATM) traffic in the TSB frame of FIG. 4 in accordance with one embodiment of the present invention.

FIGS. 5–7 illustrate transport of various types of synchronous and asynchronous traffic in the service traffic portion 104 of the TSB frame 100. In particular, FIG. 5 illustrates transport of DS-0 traffic, FIG. 6 illustrates transport of ISDN traffic, and FIG. 7 illustrates transport of ATM traffic. These and other suitable types of traffic may be together transported within the TSB frame 100.

Referring to FIG. 5, for voice traffic, each TSB channel 120 includes a data channel 130 and a signal channel 132. In the illustrated embodiment, the data and signal channels 130 and 132 are each one byte in size. The data channel 130 transports a DS-0 channel 134. The signal channel 132 transports in-band a current channel associate signaling (CAS) value 136 for the DS-0 channel 134 in the data channel 130. The CAS value indicates the hook-state of a telephony connection, including whether the phone is on-hook, off-hook, and whether the phone is ringing or not. Four bits of the signal channel 132 are reserved.

The CAS values 136 for a DS-0 connection are initially received by the line cards 40. The line card port 48 on which the CAS value 136 is received is responsible for extraction, debouncing and verifying the integrity of the CAS value 136 before it is inserted into the signal channel 132. Once a valid CAS 136 value has been extracted from an incoming TDM interface on a line card 40, the CAS value 136 is placed into the signal channel 132 and is repeated each frame 100 until another valid CAS value 136 is recovered.

By carrying the CAS value in-band with the associated DS-0 channel, the TSI 64 of the fused TDM/ATM switch card 60 can switch the CAS bits 136 together with the DS-0 traffic using a 2 byte wide switch memory and conventional switching techniques. This simplifies the design of the TSI 64 as it need not have exact knowledge of how the CAS bits 136 are spread over a superframe which requires digital logic to perform the necessary frame counts and comparisons. In addition, the in-band transmission and oversampling of the CAS values 136 allow for cross-connections between DS-0s from T1 (North American) circuits and DS-0s from E1 (European) circuits, as well as mixtures of DS-0s from the different circuits.

Referring to FIG. 6, for ISDN traffic, a set of thirty two TSB channels 120 together transport ISDN traffic 140 for a basic rate connection. The basic rate connection includes two B-channels 142 and a D-channel 144. Each B-channel 142 comprises a DS-0. The D-channel 144 comprises a ¼ DS-0, or 16 Kilobits per second (Kb/s).

The two B-channels 142 and the D-channel 144 of the ISDN traffic 140 are each transported in separate service channels 120 in a 3 DS-0 format. Thus, the TSB channel 120 carrying the D-channel is sub-utilized. A D+ channel 146 transports standards based information for the ISDN connection. In particular, the D+ channel 146 includes a density requirement bit, the first and second bit of the D-channel, maintenance (DSL overhead) channel bit (M-bit), zero bit indicator for the B-channels, DS1 yellow alarm bit and a spare bit. The B-channel 142, D-channel 144, and D+ channel 146 are preferably distributed between the thirty two channels to facilitate switching at the switch core 44.

In the illustrated embodiment, the TSB frame 100 may transport traffic for up to eight ISDN 140 interfaces, which are evenly distributed across the frame. It will be understood that traffic for ISDN connections may be otherwise suitably transported in the TSB frame 100. For example, if a line card supports more than eight ISDN interfaces, each ISDN interface may be transported in a reduced set of TSB channels 120 to accommodate the additional interfaces.

Referring to FIG. 7, for ATM traffic, a set of twenty-seven contiguous TSB channels 120 together transport an ATM cell 150. In accordance with the ATM standards, the ATM cell 150 is 53 bytes in length. Accordingly, the ATM cell 150 fits within the set of TSB service channels 120 with one byte reserved. A total of nine ATM cells 150 can be carried within each TSB frame 100. In addition, a mixture of ATM cells and DS-0 channels (with their associated CAS values) can be carried simultaneously over the TSB bus 70 in the TSB frame 100.

Each ATM cell 150 is transported in a single TSB frame 100 and is switched by the TSI 64 at the fused TDM/ATM switch card 60 without disturbing the ATM flow. Multiple ATM cells can be switched every TSB frame 100 as long as the TSI 64 maintains the original order of the ATM cells 150. In this way, asynchronous traffic can be transported over the TDM bus and synchronously switched within the integrated access device 14.

In operation, DS-0 channels from a service interface are mapped into the TSB frame 100 in an arbitrary although fixed manner, with the TSI 64 of the fused TDM/ATM switch card 60 having the same mapping for switching the traffic to a destination card within the integrated access device 14. Similarly, ISDN and ATM traffic is mapped into the TSB frame 100 in an arbitrary although fixed manner with the TSI 64 having the same mapping.

Figure 8:
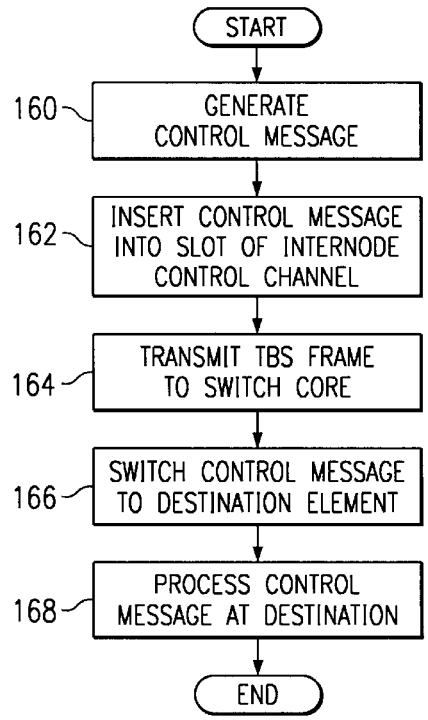
FIG. 8 is a flow diagram illustrating a method for communicating control traffic between line cards and the switch core and/or other line cards over the TSB bus of FIG. 3 in accordance with one embodiment of the present invention.

FIG. 8 illustrates a method for communicating control traffic between processors and cards in the integrated access device 14 using the internode communication channel 114 of the TSB frame 100. In the illustrated embodiment, the internode communication channel 114 is transported in a header of the TSB frame 100. It will be understood that the internode communication channel 114 may be in a trailer of the TSB frame 100 or may comprise one or more TSB channels 120 in the service traffic portion 104 of the TSB frame 100. In the latter case, one or more of the TSB channels 120 would be dedicated for internode control traffic.

Referring to FIG. 8, the method begins at step 160 in which a control message is generated at a node element. The node element may comprise a line card 40, a switch card 60 or 62, or a processor or other element of a card. The control traffic may be generated at the node element in response to a local event or in response to receiving a message from another node element.

Proceeding to step 162, the control message is inserted into a slot of the internode communication channel 114 associated with the destination device. Because the slot is associated with the destination device, addressing information need not be included with the control message. Instead, the switch core 44 will route the control message to a destination device based on the position of the message in the internode communication channel 114.

At step 164, the TSB frame 100 including the internode control channel 114 and the control message is transmitted to the switch core 44. At step 166, the switch core 44 extracts the control message and switches it to the destination element based on the position of the control message in the internode communication channel 114. Next, at step 168, the destination element receives and processes the control message. In this way, a communication link is established between line cards and/or switch cards and processors and other elements of the cards by reprovisioning the switch core 44.

Figure 9:
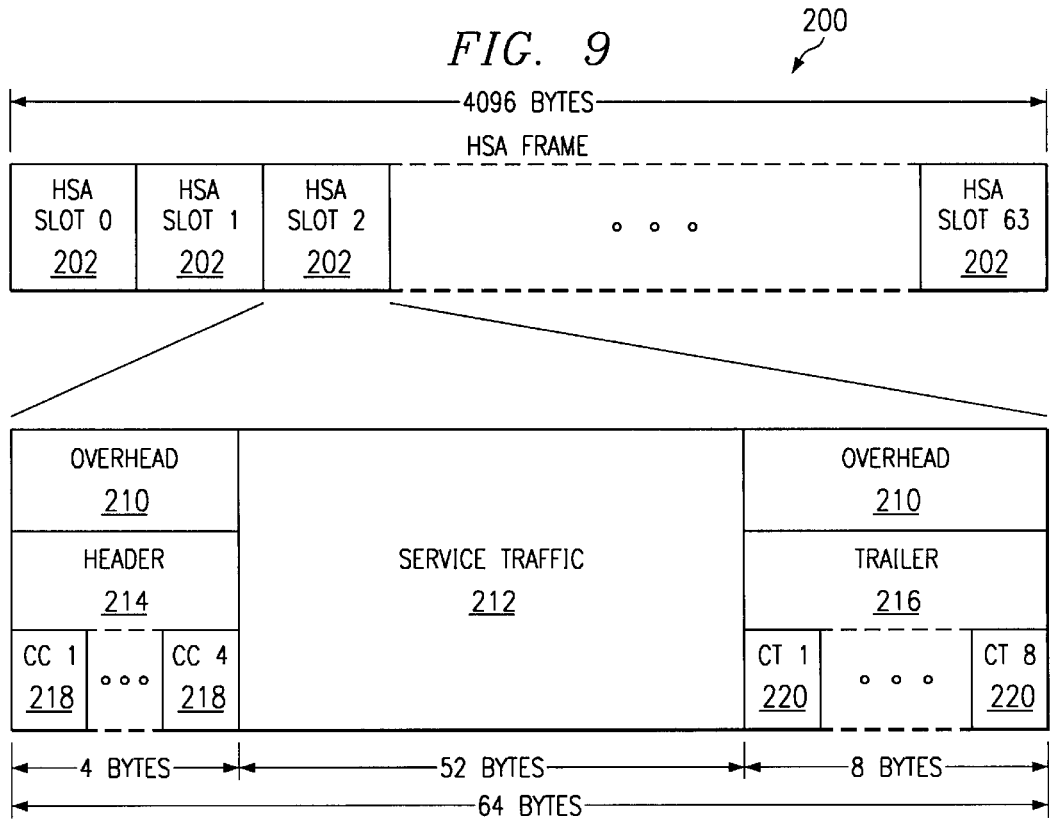
FIG. 9 is a block diagram illustrating a frame structure for the high speed ATM (HSA) bus of FIG. 3 in accordance with one embodiment of the present invention.

FIG. 9 illustrates a bus format for the HSA bus 72 in accordance with one embodiment of the present invention. In this embodiment, each point-to-point link 78 of the HSA bus 72 includes a 125 microsecond frame structure. Accordingly, each byte within the frame structure repeats every 125 microseconds and corresponds to a DS-0 channel operating at 64 bits per second (b/s).

Referring to FIG. 9, an HSA frame 200 comprises a plurality of HSA slots 202 optimized for ATM switching. A slot number per frame that is a power of two is preferable to allow ease of implementation using binary logic. Similarly, it is preferable to have slot sizes that are a power of two in order to allow for easier digital logic implementation.

In a particular embodiment, the HSA frame 200 includes 64 HSA slots 202. In this embodiment, each HSA slot 202 is 64 bytes in size, which is large enough to accommodate a single ATM cell plus overhead. The resulting overall frame size is 4,096 bytes. It will be understood that the TSB frame 200 may be otherwise suitably sized to accommodate different rates on the point-to-point links 78 of the HSA bus 72.

The speed of each HSA link 78 is based on the number of slots it carries. For the illustrated embodiment in which the HSA frame 200 includes 64 HSA slots 202 that are each 64 bytes in size, a HSA link 78 transmitting the frame 200 will operate at 262.144 Megabits per second (Mb/s). One or more of the point-to-point HSA links 78 may include an HSA frame having 256 slots 202 that are each 64 bytes in size. These point-to-point HSA links 78 operate at 1.048 Gigabit per second (Gbit/s).

At each HSA rate, the HSA slot 202 includes an overhead portion 210 and a service traffic portion 212. In one embodiment, the overhead portion 210 is 12 bytes in size and the service traffic portion 212 is 52 bytes in size. In this embodiment, as described in more detail below, ATM traffic including ATM cells and AAL cells are modified from their standard format that is 53 bytes in length to a reduced size of 52 bytes to fit within the service traffic portion 212 of the HSA slot 202.

The overhead portion 210 includes a slot header 214 that is 4 bytes in size and a slot trailer 216 that is 8 bytes in size. The slot header 214 includes cell control bytes (CC) 218 1–4. The slot trailer 216 includes cell trailer bytes (CT) 220 1–8. In a particular embodiment, the last 6 bytes of the slot trailer 216 are used as part of the slot header 214 for the next HSA slot 202. In this embodiment, the first HSA slot in a frame receives additional slot header bytes from the slot trailer in the previous frame. Thus, each HSA slot 202 has an effective slot header 214 that is 10 bytes in size and an effective slot trailer 216 that is 2 bytes in size.

Figure 10:
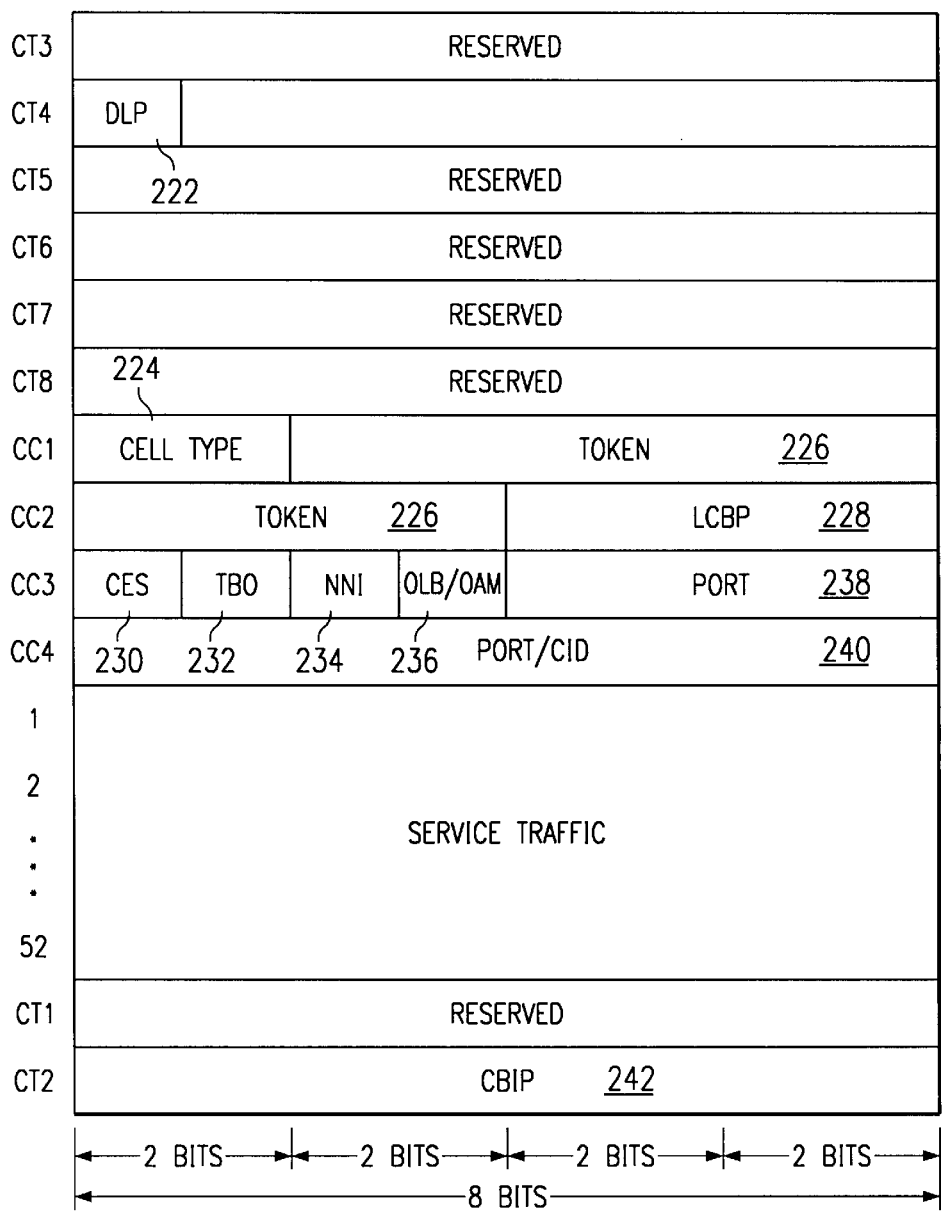
FIG. 10 is a block diagram illustrating details of the control channel header and trailer for each slot of the HSA frame of FIG. 9 in accordance with one embodiment of the present invention.

FIG. 10 illustrates the details of the CC bytes 218 and CT bytes 220 in accordance with one embodiment of the present invention. In this embodiment, CT bytes 3–6 in each HSA slot 202 are used along with CC bytes 1–4 of the following HSA slot 202 to form the slot header for the following HSA slot 202. CT bytes 1–2 form the slot trailer.

Referring to FIG. 10, CT byte 3, and bytes 5–8 are reserved. CT byte 4 concludes a 2 bit delay processing (DLP) field 222. The DLP value identifies cell priority level for queuing purposes. In an exemplary embodiment, the DLP value ranges from 0–3, with a "0" value being the highest priority.

CC byte 1 includes a 2 bit cell-type field 224. The cell type field 224 identifies the type of traffic being transported in the service traffic portion 212 of the HSA slot 202. In the exemplary embodiment, the cell type value ranges from 0–3, with a "0" value indicating that the HSA slot 202 is transferring ATM cells (either idle cells or valid cells as specified by the CES bit described below), a value of "1" indicates that the cell is a TDM cell, a value of "2" indicates that the cell is to be extracted by the microprocessor for processing, and a value of "3" is reserved.

The remainder of CC byte 1 together with CC byte 2 provides a token field 226 in the egress direction from the switch core 44 to the line card 40. In the ingress direction from the line card 40 switch core 44, CC byte 2 instead includes a line card back-pressure (LCBP) field 228. Token information is used to inform the line card ports 48 of their chance to send an ingress cell toward the switch core 44. A token value carries a port number of a unique line card port 48. Line card ports 48 that do not receive tokens are not allowed to transmit ingress cells toward the switch core 44. In response to a valid token received at a line card 40, the line card 40 will transmit an appropriate ingress cell in an HSA slot 202 following the token. In a particular embodiment, the ingress cell is transmitted in a third HSA slot 202 following the token to provide ample latency to allow extension interfaces to respond.

The LCBP field 228 provides back-pressure information for ports on a line card 40. Back-pressure information is used to relay buffer fill-levels for line cards 40 back to the switch core 40 in order to control the flow of the egress cells to the line card buffers, which may be limited in size and should not be allowed to overflow. Provision of back-pressure information allows the buffer threshold at which back-pressure is applied to be programmable for the line cards 40.

In the exemplary embodiment, the LCBP information provides unique back-pressure control for each port on a line card 40 as part of every fourth ingress cell to allow for improved control loop response. In the switch core 44, the 8 bits of back-pressure mapped to 32 possible ports over the course of four cells via a repeating modulo-4, slot-based mechanism. A LCBP value of "1" indicates that a line card egress buffer associated with the given port cannot accept additional egress traffic. When the LCBP value is cleared to "0", the switch core 44 is again allowed to send egress cells to the port number.

CC byte 3 includes a 1 bit contains empty cell (CES) field 230, a 1 bit transmit buffer open (TBO) field 232, a 1 bit network-network interface (NNI) field 234, a 1 bit operation, administration, and management (OAM) loop-back and OAM (OLB/OAM) field 236. The CES value indicates whether the HSA slot 202 contains a valid cell. In the exemplary embodiment, a CES value of "1" indicates the cell slot 202 does not contain a valid payload (usually meaning the cells slot is idle) while a CES value of "0" indicates the cells payload is valid.

The TBO field 232 is used in the ingress cell direction and applies to a port specified in the slot header 214. The TBO value is used in connection with the LCBP value to indicate back-pressure for a given port. If the ingress cells rate is not sufficient to provide timely back-pressure information to the switch core 44 via the TBO field 232, the line card 40 can provide the TBO bit during idle cells slots.

The NNI field 234 is used in the ingress cells direction to indicate a network-network interface. In the exemplary embodiment, an NNI value of "2" indicates that the line card 40 is receiving cells on an NNI. This information is relayed to the switch core 44 for proper VPI field look-up. When cleared to "0", the NNI value indicates the line card 40 is receiving cells on a user-network interface (UNI).

The OLB/OAM field 236 provides OAM loop-back information in the ingress cell direction and OAM identification in the egress cell direction. These bits are used to identify OAM cells that require special processing. In the exemplary embodiment, the OLB bit is set in the ingress direction to indicate to the fused TDM/ATM switch card 60 that the cell should be looped back to the line card port 48 as specified by the port number if the cell is an OAM cell. The fused TDM/ATM switch card 60 will set the OAM bit in the egress direction to flag the cell as one to be terminated at the line card 40 and not pass to the port 48. The use of the OLB and OAM bits allow a line card 40 to terminate all incoming OAM cells by local processor after the cells are identified and looped-back by the switch core 44 without the need for the line card processor to identify the OAM cells by using a full-blown lookup algorithm. Additionally, line card 40 to line card 40 processor communication can be achieved via processor generated cells directed to the loop-back to a different line card port 48. In this case, the OLB bit is set by the line card 40 but the port number attached to the cell is changed to that of the destination port 48 to allow the switch card 44 to switch the cell according to its normal port number/VPI/VCI/OAM look-up processes to the desired line card port 40 with the egress OAM bit set. Further information regarding the identification, loop-back and processing of OAM cells is described in U.S. Patent Application entitled "Method and System for Distributed Processing of Traffic in a Telecommunications Node", Ser. No. 09/419,204, filed Oct. 15, 1999.

The remainder of CC byte 3 together with CC byte 4 forms a port field 238. For ATM traffic, as described in more detail below, CC byte 4 may instead be used in connection with a cell header in the service traffic portion 212 for a cell identification (CID) field 240. A port value specifies the logical line port that traffic in the HSA slot 202 has originated from in the case of egress cells or is destined to in the case of ingress cells. For the CID field 240, the line card 40 replaces any protocol-specific header information such as VPI/VCI with a unique CID value that is used by the switch core 44 to switch the cell. The CID field 240 is retained in the egress direction to allow the target line card 40 to map the CID back to a protocol-specific header prior to transmission.

Following the cell header 214, service traffic is transported in the HSA slot 202. The slot transfer 210 follows the service traffic and includes CT bytes 1–2. CT byte 1 is reserved. CT byte 2 includes an 8 bit cell bit interleaved parity (CBIP) field 242. The parity value is odd and is calculated over the bytes CC one through the end of the service traffic portion 212 of the HSA slot 202. As previously described, the remainder of the CT bytes are used as part of the slot header for the following HSA slot 202.

Figure 11:
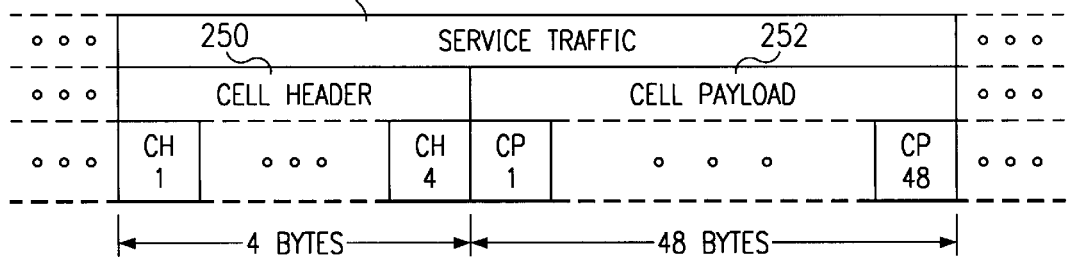
FIG. 11 is a block diagram illustrating transport of ATM traffic in the HSA frame of FIG. 9 in accordance with one embodiment of the present invention.
Figure 12:
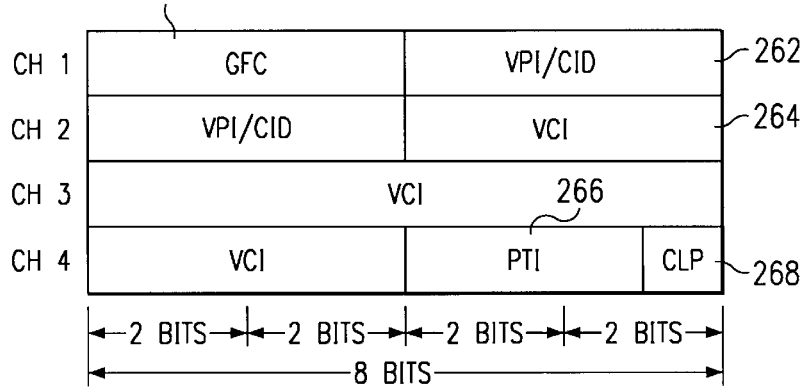
FIG. 12 is a block diagram illustrating details of the cell header for the ATM traffic of FIG. 11 in accordance with one embodiment of the present invention.
Figure 16:
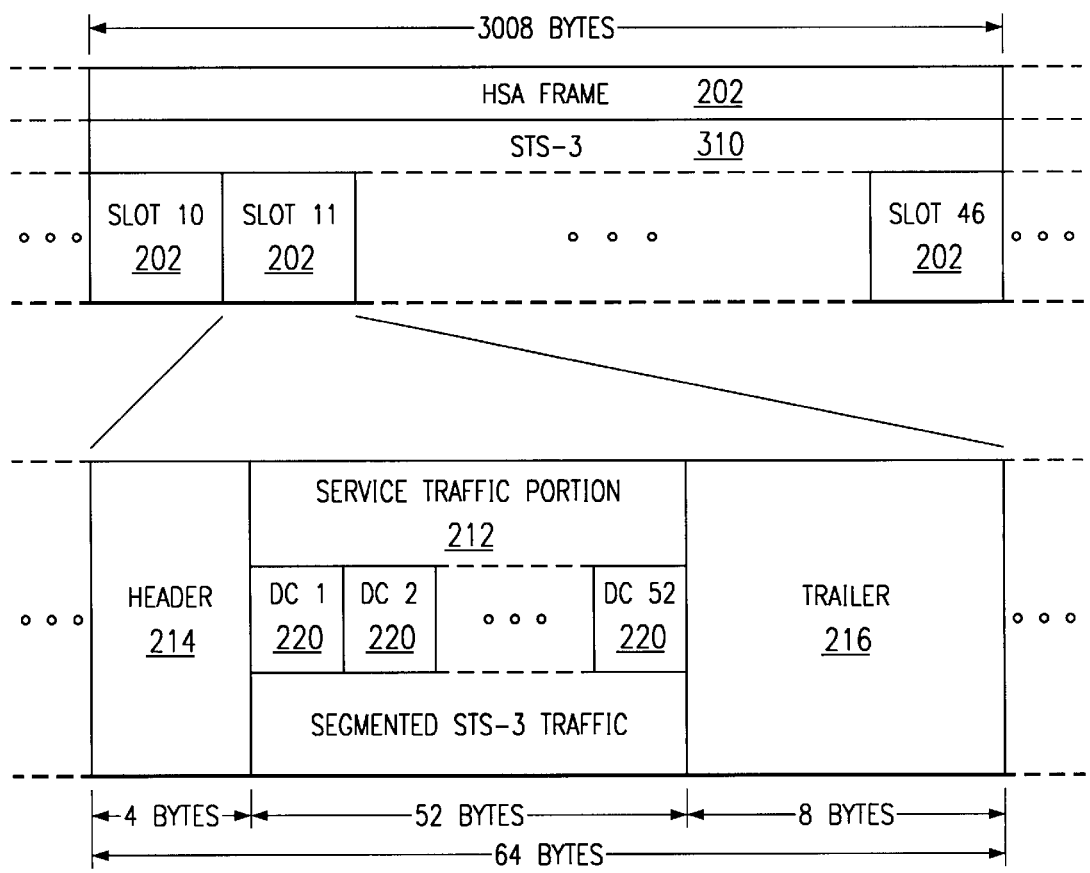
FIG. 16 is a block diagram illustrating transport of synchronous transmission signal (STS-N) traffic in the HSA frame of FIG. 9 in accordance with one embodiment of the present invention.
Figure 13:
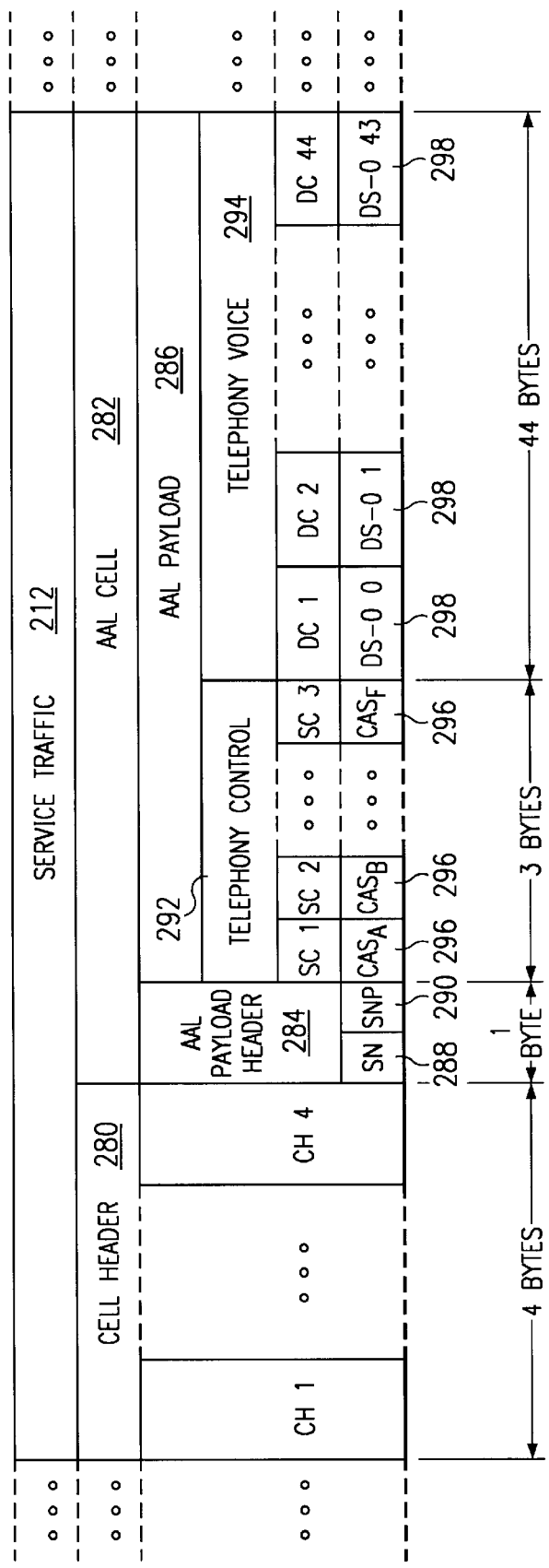
FIG. 13 is a block diagram illustrating transport of telephony voice (DS-0) traffic in an ATM adaption layer (AAL) cell in the HSA frame structure of FIG. 9 in accordance with one embodiment of the present invention.
Figures 14, 15:
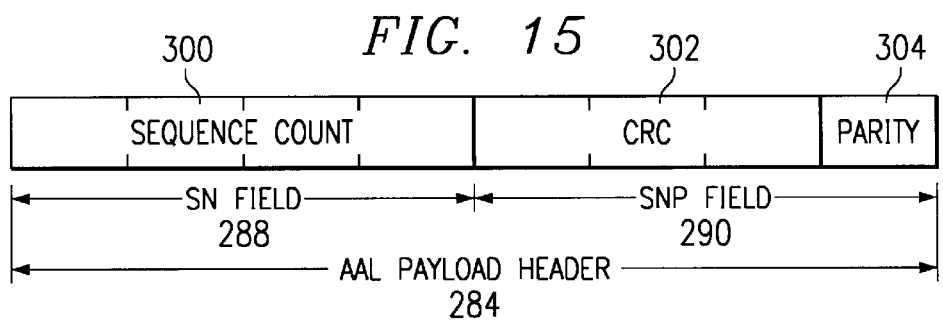
FIG. 14 is a table illustrating association of the in-band channel associated signaling (CAS) values with the DS-0s traffic in the AAL cell of FIG. 13 in accordance with one embodiment of the present invention.
FIG. 15 is a block diagram illustrating details of the AAL payload header for the AAL cell of FIG. 13 in accordance with one embodiment of the present invention.

FIGS. 11–16 illustrates transport of various types of synchronous and asynchronous traffic in the service traffic portion 212 of the HSA frame 200. In particular, FIGS. 11–12 illustrates transport of ATM traffic, FIGS. 13–15 illustrate transport of AAL traffic, and FIG. 16 illustrates transport of SDH traffic. These and other suitable types of traffic may be transported together within the HSA frame 200. For example, internal TDM traffic can be transmitted in an AAL-like slot 202 with the header information omitted.

Referring to FIG. 11, for ATM cells, the service traffic portion 212 of a HSA slot 202 includes a cell header 250 and a cell payload 252. In the illustrated embodiment, the cell header 250 is four bytes in size, and includes cell header (CH) bytes 1–4. The cell header 250 is a modified ATM cell header with the standardized header error correction (HEC) field removed and protocol-specific header information translated to the CID 240. The HEC field is used over physical transmission interfaces and is unnecessary within the integrated access device 14 due to the very low bit error rates of a digital system. Accordingly, the cell header 250 for intranode transmission of an ATM or AAL cell is reduced from the standardized five bytes to four bytes and with the cell payload 252 fits within the service traffic portion 212 of the HSA slot 202. The cell payload 252 includes cell payload (CP) bytes 1–48 that together transport the payload of an ATM cell.

FIG. 12 illustrates details of the four byte cell header 250 in accordance with one embodiment of the present invention. In this embodiment, the cell header 250 includes a 4 bit generic flow control (GFC) field 260, an 8 bit VPI/CID field 262, a sixteen bit VCI field 264, a three bit payload type indicator (PTI) field 266, and a cell loss priority (CLP) field 268. In accordance with ATM standards, the GFC value provides local functions, such as identifying multiple stations that share a single ATM interface. The GFC field 260 may be unused and set to its default value. Values in the PTI field 266 and the CLP field 268 are each passed through the line cards 40 and the switch core 44 in accordance with ATM standards.

As previously described in connection with the slot header 214, the port and VPI fields of an incoming ATM cell are translated by the line card 40 to the unique CID value. The line cards 40 generate the CID for each cell by performing a look-up on the VPI/VCI, IP destination address and/or other suitable information and mapping it to one of 64K CID's. The CID value is used by the switch core to identify a target queue in switching memory, enabling the switch core 44 to efficiently route the ingress cell. The VCI value is passed through a switching fabric unmodified in the case of virtual path connections (VPC), or modified in the case of virtual channel connections (VCC).

After switching by the switch core 44, the CID is transparently passed to an output line card 40 where the CID is used for egress header translation prior to transmission out of the integrated access device 14 or to the unibus 74 where the CID maps into suitable fields for transmission to and processing by the fused TDM/ATM switch card 60. Preferably, the high capacity ATM switch card 62 does not have to modify the CID or other switching tags of cells cross-connected between the HSA bus 72 and the unibus 74. It will be understood that the cell header of an ATM cell received from an external link may be otherwise suitably modified for internal processing by the integrated access device 14.

Referring to FIG. 13, for AAL cells, the service traffic portion 212 of the HSA slot 202 includes a cell header 280 and an AAL cell 282. The cell header 280 includes CH bytes 1–4 as previously described in connection with the cell header 250 for an ATM cell. The AAL cell 282 includes an AAL payload header 284 and a AAL payload 286. As described in more detail below, the AAL payload header 284 includes a sequence number (SN) field 288 and a sequence number protection (SNP) field 290. The SN and SNP fields 288 and 290 may include standard information or may, as described in more detail below, be modified for improved switching efficiency within the ingress access device 14.

The AAL payload 286 includes a telephony control portion 292 and a telephony voice portion 294. The telephony control portion 292 includes in-band CAS values 296 transmitted within the AAL cell 282. As described in more detail below, the CAS values 296 are each repeated in the same or a different frame to form a full byte to make feasible or facilitate switching and reconstitution of the traffic in the telephone voice portion 254 at a destination node. The telephony voice portion 294 includes a set of DS-0 channels 298 with which the successive CAS values are associated.

In a particular embodiment, a superframe is constructed such that the CAS value for each DS-0 channel appears at least once every sixteen cells. This is assuming a given DS-0 is placed in every cell. This is done because the CAS value is updated once every sixteen DS-0s by European data circuit terminating equipment (DCE). In North America, the DEC updates the CAS value once every twenty-four DS-0s. By updating the CAS value at least once every sixteen DS-0, compliance is assured for both systems.

In this dual accommodation embodiment, the AAL payload 286 includes CAS values 296 for up to six DS-0 channels 298 and forty four DS-0 channels 298. In this embodiment, a superframe consists of sixteen frames with each frame having an AAL cell. Preferably, the number of the frame within the superframe explicitly determines the DS-0 channel 298 with which each CAS value 296 is associated. For the illustrated embodiment, CAS values 296 may be associated with DS-0 channels 298 based on a modulo sixteen counter as illustrated by the table of FIG. 14.

Referring to FIG. 14, the first HSA slot 202, ("0") includes CAS value 296 for DS-0 channels 0–5. The successive frames include CAS values 296 for the next three DS-0 channels 298 as well as repeats of three previous CAS values. In this way, all of the CAS values 296 for the 44 DS-0 channels are transmitted and repeated within the superframe and substantially evenly distributed between each frame with two CAS slots being unused. It will be understood that the in-band CAS values 296 may be otherwise suitably associated with their DS-0 channels. The in-band transport of the CAS values 296 eliminates superframe jitter and allows the frame size to exactly correspond to 48 byte ATM cell payload. This means that the start of the frame is fixed and thus always known for the illustrated embodiment.

FIG. 15 illustrates the AAL payload header 284 in accordance with one embodiment of the present invention. In this embodiment, the AAL payload header 284 includes the SN field 288 and the SNP field 290. Because, as previously described, the cell payload exactly corresponded to a frame, the frame pointer is not required. Accordingly, the SN field 288 is modified from the AAL1 standard to remove the convergence sublayer indicator (CSI) bit, which is used to indicate the pointer byte and includes a four bit sequence count 300. The four bit sequence count facilitates a sixteen frame count, which is ideal for the CAS transfer rate required by European standards and which is in a more general case compared with a twenty-four frame count of the North American standards. The SN fields 290 includes a three bit CRC value 302 in a parity bit 304 in accordance with the AAL1 standard.

In the in-band transmission of the CAS values 296, in the HSA bus 72 eliminates the needs to find a frame boundary within a continuance AAL1 cell stream as frame boundaries are explicitly defined by cell payload. Accordingly, no real frame processing is required. In addition, because the frame boundaries correspond to AAL payload boundaries, an AAL reassembly processor that terminates an AAL VC can be readily constructed from a single modified ATM switch designed to recognize and process in-band CAS values and the four bit sequence counter 300. Further information regarding the in-band transmission of CAS values is described in U.S. Patent Application entitled "Method and System for Transmitting Traffic Having Disparate Rate Components", Ser. No. 09/390,420, filed Sept. 3, 1999.

Referring to FIG. 16, for SDH traffic, segmented STS-N traffic is transported in data channels (DC) 1–52. The line card 40 performs segmentation and reassembly (SAR) in order to support the HSA frame format for SDH traffic. For a STS-3 frame 310, the frame is segmented into 47 HSA slots 202 each transporting 52 bytes of the STS-3 frame. The bytes of the STS-3 frame 310 are mapped into the 47 HSA slots 202 using byte ordering of synchronous optical network (SONET): A-1, A1-2, A1-3, A2-1, A2-2, A2-3 . . . . The 47 HSA slots 202 at 52 bytes each provide 2,440 bytes, with the excess 14 bytes being the last 14 bytes in slot number 46. Other types of SDH traffic may be similarly segmented into, transported in, and reassembled from a set of HSA slots 202.

Each HSA slot 202 includes the slot header 214 and the slot trailer 216. Within the service traffic portion 212, segmented STS-3 traffic is transported in data channels (DC 1–52) other types of STH traffic may be similarly segmented transported and reassembled on the HSA bus 72.

Figure 17:
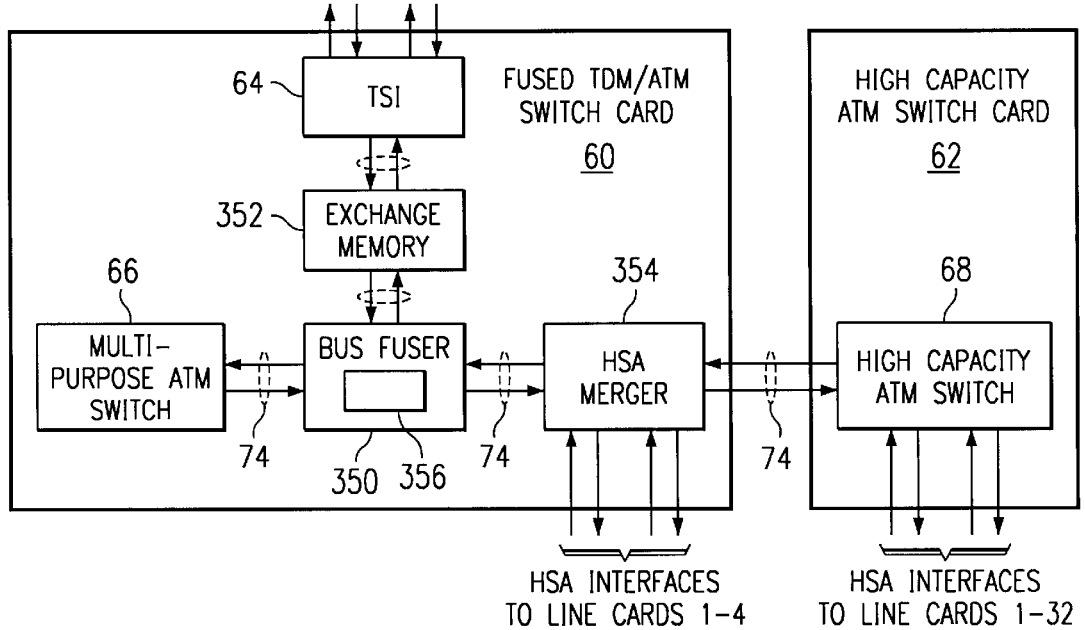
FIG. 17 is a block diagram illustrating details of the fused TDM/ATM switch card and the high capacity ATM switch card of FIG. 3 in accordance with one embodiment of the present invention.

FIG. 17 illustrates details of the fused TDM/ATM switch card 60 and the high capacity ATM switch card 62 in accordance with one embodiment of the present invention. In this embodiment, the fused TDM/ATM switch card 60 terminates the point-to-point links 76 of the TSB bus 70 for each line card 40 and also terminates point-to-point links 78 of the HSA bus 72 for a limited set of the line cards 40. As previously described, the HSA links 78 to the fused TDM/ATM switch card 60 provide a more scalable architecture for the integrated access device 14 by allowing limited high speed ATM functionality without the need for the high capacity ATM switch card 62. For high speed applications, the high capacity ATM switch card 62 is used in conjunction with the fused TDM/ATM switch card 60 and terminates a point-to-point link 78 of the HSA bus 72 for each line card 40.

Referring to FIG. 17, the fused TDM/ATM switch card 60 includes a bus fuser 350, the TSI 64, an exchange memory 352, the multi-purpose ATM switch 66, and a HSA merger 354. The unibus 74 connects the fuse TDM/ATM switch card 60 to the high capacity ATM switch card 62 and within the fused TDM/ATM switch card 60 connects the bus fuser 350 to the multi-purpose ATM switch 66 and to the HSA merger 354. The bus fuser 350 and TSI 64 are each connected to the exchange memory 352 and exchange traffic through the exchange memory 352. This allows traffic received on the TSB bus 70 to be switched by any of the TSI 64, the multi-purpose ATM switch 66, and the high capacity ATM switch 68 and to be transmitted to a line card 40 on either the TSB bus 70 or the HSA bus 72. Similarly, traffic received on the HSA bus 72 may be switched by any of the high capacity ATM switch 68, the multi-purpose ATM switch 66, and the TSI 64 and transmitted to a line card 40 on either the TSB bus 70 or the HSA bus 72. To facilitate the exchange of traffic between the TDM and ATM realms, the bus fuser 350, TSI 64, multi-purpose ATM switch 66 and HSA bus merger 354 each operate at a synchronized frame pulse of 125 microseconds. This flexibility and synchronized operation allows the integrated access device 14 to support a large number of traffic handling combinations. It will be understood that the functionality of the switch core 44 may be otherwise suitably distributed between the switch cards 60 and 62 and between components on the switch cards 60 and 62 to form a fused switch core 44 capable of switching TDM, ATM, and STS-N traffic.

The bus fuser 350 receives traffic from the TSI 64, the multi-purpose ATM switch 66, and the HSA merger 354 and routes the traffic to another one of the TSI 64, the multi-purpose ATM switch 66, and the HSA merger 354 based on program switching instructions. The bus fuser 350 exchanges traffic with the TSI 64 through the exchange memory 350. In one embodiment, the exchange memory 352 is configured for TSI 64 operations with the bus fuser 350 translating traffic into and out of the exchange memory 352 for processing within the ATM realm. In this embodiment, the bus fuser 350 segments traffic channels received from the exchange memory 352 into traffic cells for switching and transport within the ATM realm and reassembles traffic cells destined for the TDM realm into traffic channels for storage in the exchange memory 352 and processing by the TSI 64. The bus fuser 350 also switches STS-N traffic by loading associated slots in an incoming HSA frame into a next slot period in an outgoing HSA frame. This allows slots with STS-N traffic to be transferred from one STS-N line card 40 to another. Other types of traffic that do not require ATM or TDM switching may be similarly switched by the bus fuser 350.

In transferring traffic between the TDM and ATM realms, the bus fuser 350 extracts slots from unibus 74 and presents DS-0 channels carried in those slots to the TSI 64 through the exchange memory 352, with the DS-0 format being one that can be processed by the TSI 64. In one embodiment, the bus fuser 350 extracts one HSA slot 202 at a time and sends the DS-0 channels from the slot 202 to the exchange memory 352 for processing by the TSI 64. In the direction from the TDM realm to the ATM realm, the bus fuser 350 reads DS-0 channels from the exchange memory 352 required to create a complete HSA slot. Before transmitting each completed slot 202, the bus fuser 350 attaches the necessary overhead and control information. In the embodiment in which CAS bits are carried in-band, the bus fuser 350 translates DS-0 samples, with their accompanying CAS bits, between the TDM and ATM realms.

In a particular embodiment, the bus fuser 350 reads memory locations in a lower half of the exchange memory 352. In this embodiment, the TSI 64 is programmed to store relevant traffic channels into this portion of the exchange memory 352 for access by the bus fuser 350. At the same time the bus fuser 350 is reading traffic from the exchange memory 352, it is writing traffic to the lower half of the exchange memory 352 for retrieval and processing by the TSI 64. In a particular embodiment, the bus fuser 350 includes a scheduler 356 that coordinates the entire switched fuse operation. The scheduler 356 operates at the 125 microsecond frame pulse and is coordinated with the provisioning of the TSI 64. The scheduler 356 manages outgoing slot allocation and incoming slot allocation. For outgoing slot allocation, the scheduler 356 specifies whether the multi-purpose ATM switch 66 or the bus fuser 350 writes to a given outgoing slot. Outgoing slot allocation is used to transfer slots from the multi-purpose ATM switch 66 to the bus fuser 350 and, is coordinated with incoming slot allocation to facilitate STS-N switching. For incoming slot allocation, the scheduler 356 specifies whether the line cards 40 or the bus fuser 350 writes to a given incoming slot. Incoming slot allocation is coordinated with tokens sent beforehand that indicate to specific line cards that they should launch an incoming slot. Alternatively, the scheduler 356 may be implemented in a distributed manner in the TSI 64, the bus fuser 350, and the multi-purpose ATM switch 66. Further information regarding the structure and operation of the bus fuser 350 is described in more detail below in connection with FIG. 18.

The TSI 64 terminates a point-to-point TSB link 76 for each line card 40. The TSI 64 receives traffic from the line cards 40 on the TSB bus 70 and writes the traffic into the exchange memory 352. In accordance with program instructions, the TSI 64 writes traffic from the exchange memory 352 onto the TSB bus 70 for transmission to the line cards 40. In this way, the TSI 64 synchronously switches traffic between the line cards 40 as well as makes traffic available to other components within the switch core 44 through the exchange memory 352. Further information regarding the structure and operation of the TSI 64 is described in more detail below in connection with FIGS. 19–23.

The exchange memory 352 allows the bus fuser 350 and the TSI 64 to independently access stored traffic. The exchange memory 352 is a dual port RAM or other suitable memory device that allows two independent memory access circuits to operate on the same memory space. For example, a single memory access circuit that operates at a high speed such that it responds like two independent circuits may be used for the exchange memory 352.

The multi-purpose ATM switch 66 receives traffic cells from the bus fuser 350 and switches the cells based on header information within the cells. The cells are switched to output queues within the multi-purpose ATM switch 66 that are each associated with an output port. From the output queues, switched traffic is passed to the bus fuser 352 for routing to the appropriate output port. Further information regarding the structure and operation of the multi-purpose ATM switch 66 is described in more detail below in connection with FIGS. 24–28.

The HSA merger 354 terminates a point-to-point HSA link 78 for four line cards 40. The HSA merger 354 combines traffic from the point-to-point HSA links 78 with ingress traffic from the unibus 74 to form a single HSA stream containing the aggregated traffic. Because slot availability times on the line card and bus fuser HSAs may differ, the HSA merger 354 buffers the HSA slots and handles bit-write differences. Because the HSA merger 354 does not have TDM or ATM switching capability, traffic is passed through from the line cards 40 to the bus fuser 350 and then to the TSI 64 or the multi-purpose ATM switch 66 for switching.

The capacity of the unibus 74 between the HSA merger 354 and bus fuser 350 (bus fuser HSA) must be greater than or equal to the total traffic level on all of the line card HSA links 78. This is insured by keeping the total number of active time slots on all of the line cards HSA links 78 in a 125 microsecond frame period less than or equal to the total number of slots available on the bus fuser HSA during the same period. In a de-multiplexing embodiment, the line card HSA links 78 operate at a lower rate than the bus fuser HSA. In this embodiment, the total number of slots on all the line card HSA links 78 is no greater than the number of slots on the bus fuser HSA and simple de-multiplexing can be employed. In particular, ingress HSA slots from the line cards 40 and the unibus 74 are combined in a fixed order for transmission to the bus fuser 350. For egress traffic, the HSA merger 354 transmits the entirety of the traffic to the high capacity ATM switch card 62 and routes traffic for transmission to the line cards 40 based on the port field. The line card HSA rates may be ½ to the N power of the bus fuser HSA rate to facilitate implementation of the HSA transmission circuitry using digital logic and to reduce the size of the necessary buffers.

In an alternate sub-utilization embodiment, the line card HSA links 78 are sub-utilized such that their aggregate traffic level is within the capacity of the bus fuser HSA. In a combined de-multiplexing and sub-utilization embodiment, the line card HSA links 78 operate at a lower rate than the bus fuser HSA, but their aggregate slot rate exceeds that of the bus fuser HSA. In this embodiment, the line card HSA links 78 are sub-utilized to ensure that the total number of active slots is no greater than the number of slots on the bus fuser HSA. If either form of sub-utilization is employed, the total number of line card HSA slots exceeds that of the bus fuser HSA. As a result, the bus merger 354 cannot have a fixed mapping of HSA slots. Instead, the HSA merger 354 inspects the port number of each outgoing HSA slot to determine the destination line card 40. In this embodiment, the HSA merger 354 also tracks tokens in order to determine when it should load an incoming slot from a line card HSA link 78 onto the bus fuser HSA. The tokens are passed to the line cards 40, and the HSA merger 354 moves the tokens from a given outgoing bus fuser HSA slot to a different outgoing line card HSA slot in order to ensure that the tokens arrive at the appropriate line card 40 at the proper time.

Additional HSA merger devices (not explicitly shown) can be added to allow more line cards 40 to communicate as well as to add with the interfaces to other fused switch switching units. In the later case, the HSA format may be transmitted over a physical layer that is suited to transmission between units, as opposed to over the backplane. The additional HSA merger devices can be located on separate circuit cards to allow for incremental expansion of the total HSA capacity or because of space constraints on a switching circuit card containing the fused switch. Separation of HSA merger devices onto different circuit cards can be made between any HSA merger devices.

A set of HSA merger devices forms a chain with each HSA merger device aggregating its traffic with that received from a previous HSA merger device if any, into a single stream that is transmitted to a next HSA merger device and eventually to the fused switch. Thus, the bus fuser 350 will still receive and generate a single stream of aggregated traffic. As HSA buses are chained together using multiple HSA merger devices, latency increases with distance from the fused switch. In particular, each HSA merger device in the chain adds multiple clock cycles worth of delay to the bus. To compensate for latency down the HSA chain, the HSA merger devices should be provisioned with knowledge of their distance from the fused switch and to transmit sooner to compensate for their distance. Also, because a chain can potentially add significant delay, tokens should be sent well enough in advance of the incoming HSA slots to which they refer. This allows line cards 40 at the far end of the chain to begin the incoming transmission of the HSA slot at an appropriate time.

The high capacity switch card 62 provides an upgrade path for ATM switching capacity for the fused TDM/ATM switch card 60. The high capacity ATM switch card 62 includes the high capacity ATM switch 68 which terminates a point-to-point HSA link 78 for each line card 40. When employed, the high capacity ATM switch 68 switches all of the ATM traffic except for AAL traffic destined for the bus fuser 350. In this case, the multi-purpose ATM switch 66 functions an adjunct processor and is used to de jitter TDM traffic. Thus, the fused TDM/ATM switch card 60 would handle only TDM related traffic, either conventional TDM traffic or TDM carried in AAL cells.

To support STS-N switching, the high capacity ATM switch 68 passes STS-N slots received from the line cards 40 to the bus fuser 350 with a short fixed delay, on regular 125 microsecond intervals. Thus, the STS-N slots are not buffered in the high capacity ATM switch 68 for indeterminate periods. Instead, the STS-N slots that enter in one 125 microsecond interval are switched to the correct output port and transmitted from the high capacity ATM switch 68 in the next 125 microsecond interval. This ensures that delay for STS-N traffic through the switch core 44 is fixed. Further information regarding the structure and operation of the high capacity ATM switch 68 is described in more detail below in connection with FIGS. 29–34.

In operation, the high capacity ATM switch 68 and the HSA merger 354 receive and transmit HSA slot to communicate with the line cards 40. As previously described in connection with the HSA bus 72, each HSA slot includes overhead information along with the traffic payload. The overhead information includes the slot type, whether the slot is empty or not, whether the slot contains an ATM NNI cell, whether the slot contains an ATM OAM cell, and the source and destination port number for the HSA slot. This information is used by the high capacity ATM switch 68, the bus fuser 350, multi-purpose ATM switch 66 and/or destination line cards 40. Each HSA slot also contains information that is not related to the slot being transported. This information is used by the switch core 44 for controlling the line cards 40. Tokens are sent to the line cards 40 to indicate that an HSA slot is available for transmission from the line card to the switch core 44. The token, which refers to a specific port on the line card 40, is directly correlated to an HSA slot some fixed period of time after the token has been received. Back-pressure indication bits are sent from the line card to the ATM switch with each cell sent in that direction. These bits indicate for up to eight ports 48, whether the associated physical transmission system is ready to accept new cells. If not, the switch core 44 holds the cells in its queues until the ports 48 are again available. The back-pressure indicators are generated by the ATM line cards. The scheduler 356 may generate the tokens.

Figure 18:
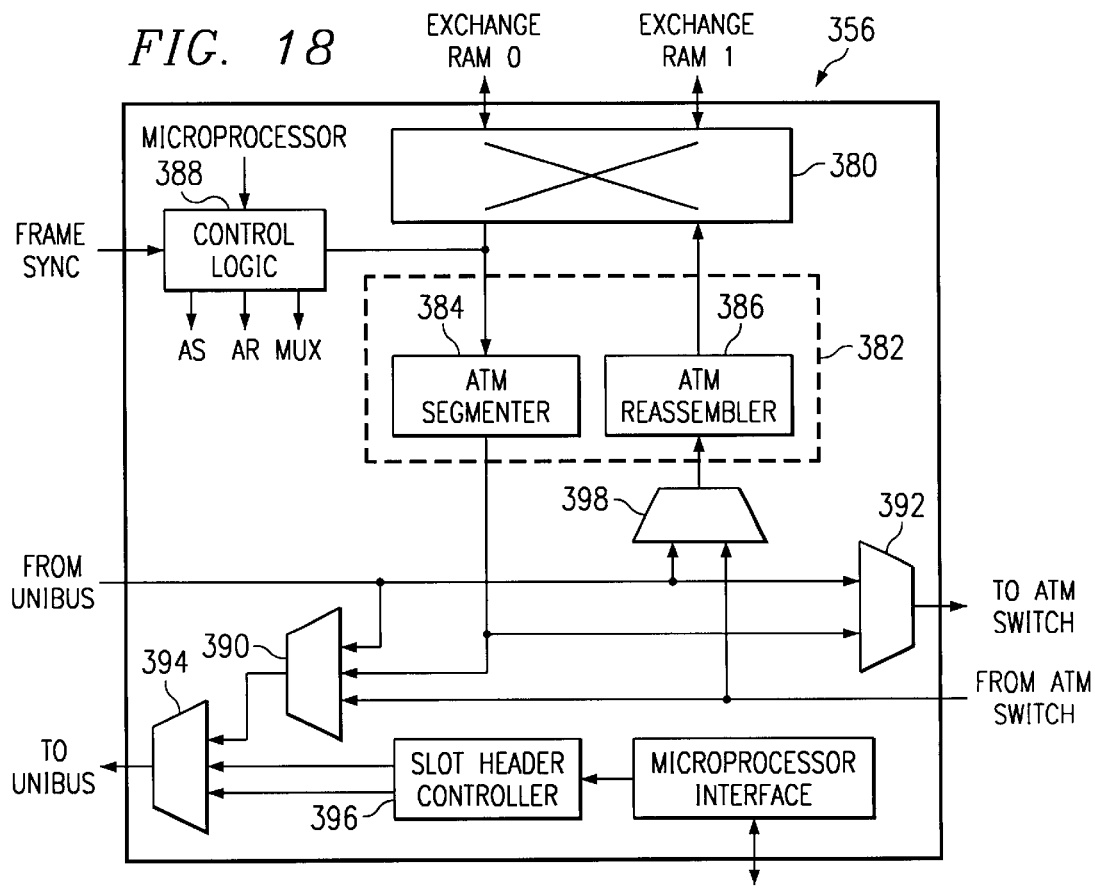
FIG. 18 is a block diagram illustrating details of the bus fuser of FIG. 17 in accordance with one embodiment of the present invention.

FIG. 18 illustrates details of the bus fuser 350 in accordance with one embodiment of the present invention. In this embodiment, the bus fuser 350 includes a RAM port selector 380 for selecting a RAM within the exchange memory 352 and a traffic converter 382 for converting between traffic cells processed in the ATM realm and traffic channels processed in the TDM realm. The traffic converter 382 includes an ATM segmenter 384 for segmenting traffic channels into traffic cells and a ATM reassembler 386 for reassembling traffic cells into traffic channels. The ATM segmenter 384 and ATM reassembler 386 are controlled by control logic 388 which operates at the synchronized 125 microsecond frame pulse.

In operation, the output of the ATM segmenter 384 is made available to a unibus output switch 390 and to an ATM output switch 392. The unibus output switch 390 selects traffic from one of the ATM segmenter 384, a unibus 74 input and the multi-purpose ATM switch 66. The output of the unibus output switch 390 is combined with a slot header at output multiplexer 394. The output header is generated by a slot header controller 396 based on program instructions. The ATM switch output switch 392 selects traffic from one of the ATM segmenter 384 and the unibus 74 input. The output of the ATM switch output switch 392 is provided to the multi-purpose ATM switch 66 for switching.

The ATM reassembler 386 receives traffic from a reassembler input switch 398. The reassembler input switch 398 selects traffic from one of the unibus 74 input and the output of the multi-purpose ATM switch 66. Each of the selectors 390, 392 and 398 are operated by the control logic 388 in accordance with program instructions and at the synchronized 125 microsecond frame pulse. In particular, an ATM segmenter (AS) signal operates the ATM segmenter 384, a ATM reassembler (AR) signal operates the ATM reassembler 386, and multiplexing (MUX) signals operate the multiplex switches 390, 392, 394, and 398. It will be understood that the bus fuser 350 may be implemented using other suitable combinations of hardware and software.

FIGS. 19–23 illustrate details of the structure and operation of the TSI 64 in accordance with one embodiment of the present invention. In this embodiment, the TSI 64 addresses sub-channel traffic to internally consolidate, expand, and switch sub-traffic. As a result, a separate sub-channel switch need not be provided to supplement the TSI 64. This reduces cost of the switch and increases board space available on the fused TDM/ATM switch card 60.

Figure 19:
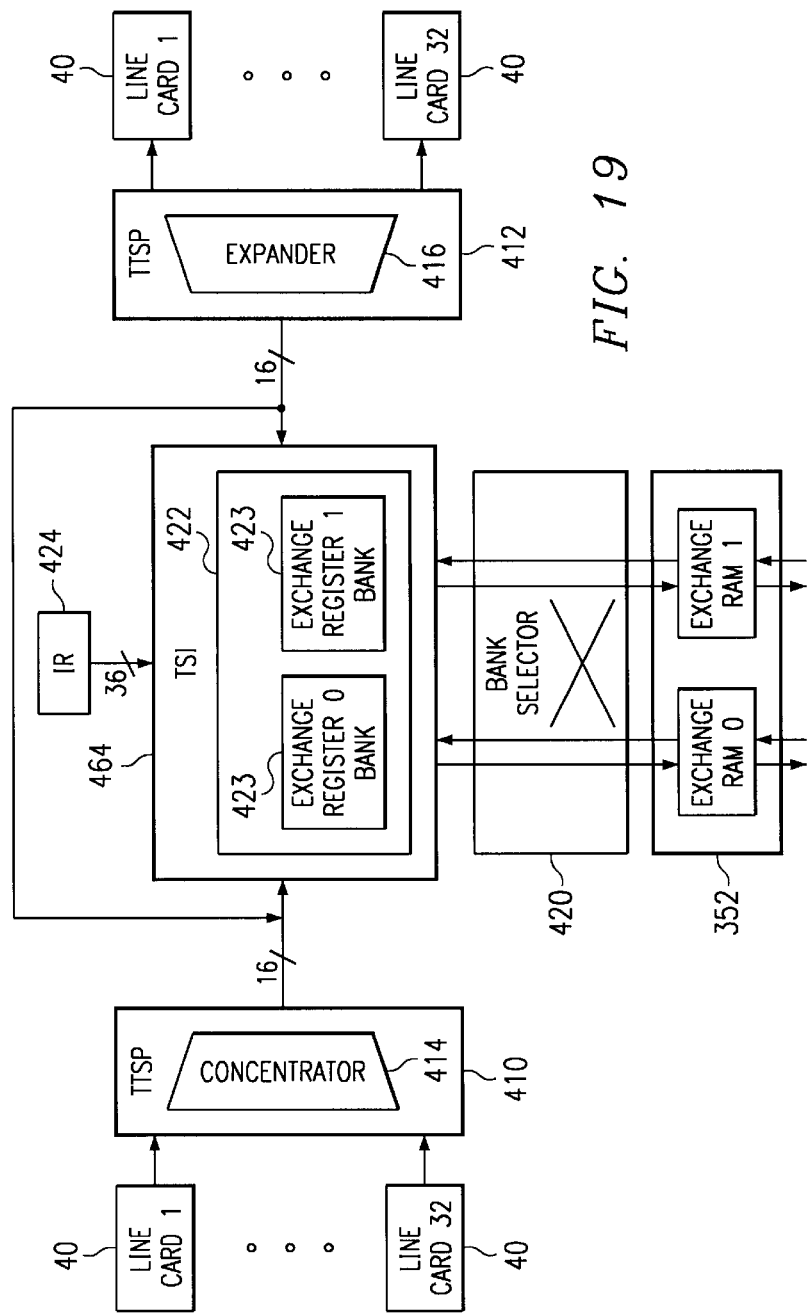
FIG. 19 is a block diagram illustrating details of the time slot interchanger (TSI) of FIG. 17 in accordance with one embodiment of the present invention.

Referring to FIG. 19, the TSI 64 is coupled to the TSB links 76 of the line cards 40 through an input TSB timing, synchronization, and protection (TTSP) interface 410 in an output TTSP interface 412. The input TTSP interface 410 includes a serial-to-parallel converter for each TSB link 76 and a concentrator 414 that multiplexes together the parallel stream produced by the thirty-two serial-to-parallel converters. In the illustrated embodiment, the concentrator 414 generates a 16 bit composite stream that is input into the TSI 64. The TSI 64, in turn, generates a 16 bit output stream that is passed to the output TTSP interface 412. The output TTSP interface 412 includes an expander 416 that de-multiplexes the TSI 64 output and serializer for each TSB link 76. The de-multiplexed output is serialized by the thirty-two serializers for transmission to the line cards 40.

The TSI 64 is coupled to the exchange memory 350 through a bank selector 420. The exchange memory 350 includes exchange RAM 0 and exchange RAM 1 between which the TSI 64 alternates each frame. In particular, egress traffic is stored into one of the exchange RAMs each frame while traffic from a previous frame is read out of the other exchange RAM during the frame. The bank selector 420 alternately selects each of exchange RAMs for receiving ingress traffic written to the exchange memory 350 by the TSI 64 or providing egress traffic read from the exchange memory 350 by the TSI 64.

The exchange RAMs each include a plurality of memory slots for storing traffic. The memory slots are each sized to store a traffic channel of the TSB bus 70 and include a plurality of discreetly addressable fields sized to store a sub-channel. In a particular embodiment, the memory slots are sized to store the data channel 130 and the signal channel 132 of the TSB channel 100. Memory for the data channel 130 is operable to store a DS-0 channel and includes four discreetly addressable fields (one-half nibbles) sized to store a ¼ DS-0. Memory for the signal channel 132 is operable to store CAS or other suitable values associated with a DS-0 channel.

The TSI 64 includes an internal exchange memory 422. The internal exchange memory 422 includes exchange register bank 0 and an exchange register bank 1 between which the TSI 64 alternates each frame in connection with the exchange RAMs. Each exchange register bank 424 includes a number of registers that are each sized like the memory slot of the exchange RAM to store a traffic channel of the TSB bus 70 and include discreetly addressable fields sized to store a sub-channel. Thus, the exchange registers 424 are each sized to store the data channel 130 and the signal channel 132 of the TSB channel 100. Memory for the data channel 130 is operable to store a DS-0 channel and includes four discreetly addressable fields (one half nibbles) sized to store a ¼ DS-0. As described in more detail below, the TSI 64 internally consolidates, expands and switches ¼ DS-0 traffic by performing read and write operations between the exchange RAM slots and the exchange registers and between fields within the exchange registers. It will be understood that the exchange memories 352 and 422 can be combined into a single exchange memory with sub-channel consolidation, expansion and switching performed between slots and/or registers of that single memory.

An instruction RAM (IR) 424 is coupled to the TSI 64 and provides program switching instructions to the TSI 64 in the form of instruction words. As described in more detail below, the instruction words provides read and write operations for transferring DS-0 and ¼ DS-0 channels between slots and registers in the exchange memories 352 and 422 and between fields in the exchange registers. The instruction words may be 36 bit words or have another suitable length. During operation, the TSI 64 linearly runs through the instruction memory 424 every 125 microseconds.

Figure 20:
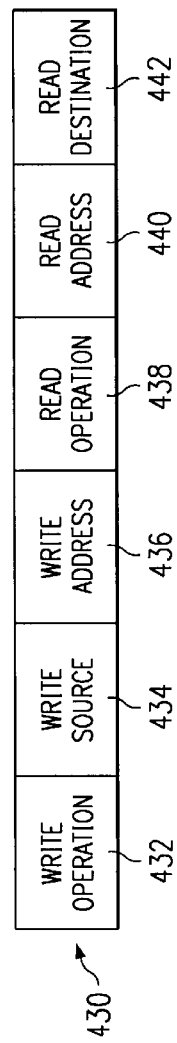
FIG. 20 is a block diagram illustrating an instruction word provided to the TSI for processing traffic in accordance with one embodiment of the present invention.

FIG. 20 illustrates an instruction word 430 provided by the IR 424 to the TSI 64 in accordance with one embodiment of the present invention. In this embodiment, each instruction word 430 provides a source of the next DS-0 whether ¼ DS-0 consolidation/expansion is to occur, the location of the next DS-0 and the destination port of the currently read DS-0. It will be understood that the instruction word 430 may include other or different information capable of dressing and switching both traffic channels and sub-channel traffic. As described in more detail below, the instruction word 430 may be extended to perform logic operations on a DS-0 or other traffic such as checking for a particular pattern (all 0s) or otherwise modifying memory.

Referring to FIG. 20, instruction word 330 includes a write operation field 432, a write to source field 434, a write address field 436, a read operation field 438, a read address field 440, and a read destination field 442. The write operation field 422 indicates whether a word (DS-0 or ¼ DS-0) is to be written into the exchange memory 352 or the internal registers 422. The write source field 434 provides the source of the word to be processed. The write address field 436 indicates the memory or register location to which the current word is written. The write source and address fields 434 and 436 may each address ¼ DS-0 channels by identifying a memory location and a field within that memory location.

The read operation field 438 determines whether a word is to be read from the exchange memory 352 or the internal registers 422. The read address field 440 provides the RAM or register address from which the next word will be read. The read destination field 442 indicates whether the word is to be directed to the serial interface or the parallel interface. The read address and read destination fields 440 and 442 may each address ¼ DS-0 channels by identifying a memory location and a field within the memory location.

In a particular embodiment, a write operation of "0" indicates that the identified DS-0 is to be written to the indicated address in the exchange memory 352. A write operation of "1" indicates that a DS-0 or combined ¼ DS-0 channel (four ¼ DS-0 channels) is to be written to an identified exchange register. A write operation of "2" indicates that an identified ¼ DS-0 is to be written to an exchange register. In this embodiment, the ¼ DS-0 is always written to the first field in the exchange register. A read operation of "0" indicates that a DS-0 or combined ¼ DS-0 channel is to be read from exchange RAM to an indicated address. A read operation of "1" indicates that a ¼ DS-0 is to be read from an indicated field in an exchange memory slot to an indicated address. For this read operation, the ¼ DS-0 will appear in the first field of the destination address. A read operation of "2" indicates that a DS-0 or combined ¼ DS-0 channel is to be read from an identified exchange register to an identified address. A read operation of "3" indicates that a ¼ DS-0 is to be read from an identified field in an exchange register to a destination address. A write source value of "0" indicates that the next input is from an input TTSP interface 410 port while a value of "1" indicates that the next input value is a value currently being read out via the read operation. Using these operations, the TSI 64 may loop-back a ¼ DS-0 channel to switch the field or register in which the channel resides by setting the read operation to "1", the write operation to "2", and the write source to "1". Using these fields, ¼ DS-0 and other sub-channel traffic can be expanded from one traffic channel into a plurality of traffic channels, consolidated from a plurality of traffic channels to a shared traffic channel or switched between fields in a traffic channel.

In operation of the TSI 64, the input interface TTSP 410 receives the TDM traffic channels arriving from the line cards 40. The concentrator 414 samples data in a deterministic manner. The IR 424 provides addresses in exchange memory 352 to which the TDM channels are to be written. The TSI 64 writes one frame of TDM channels (8,192 traffic channels) into one of the exchange RAMs. At the same time, the TSI 64 reads traffic channels from the other exchange RAM using the read addresses supplied by the IR 424. The expander 416 separates out the TDM stream output by the TSI 64 in a terministic manner. The instructions in the IR 424 are sequenced such that the TDM output stream is expanded to the desired line card 40 in the desired order. The output traffic channels are provided to the output TTSP interface 412 for processing and transmission to the line cards 40. At the end of the frame the bank selector 420 changes the direction of the exchange RAMs. Because the TDM concentrator 414 and the TDM expander 416 operate on TDM streams within a period of 125 microseconds, the read and write addresses can be programmed to switch or re-order any TDM channel including sub-channels from any port 48 to any other line card port 48. At the time that the TSI 64 is reading from an exchange RAM, the bus fuser 350 is reading from a second port of the exchange RAM.

Figure 21:
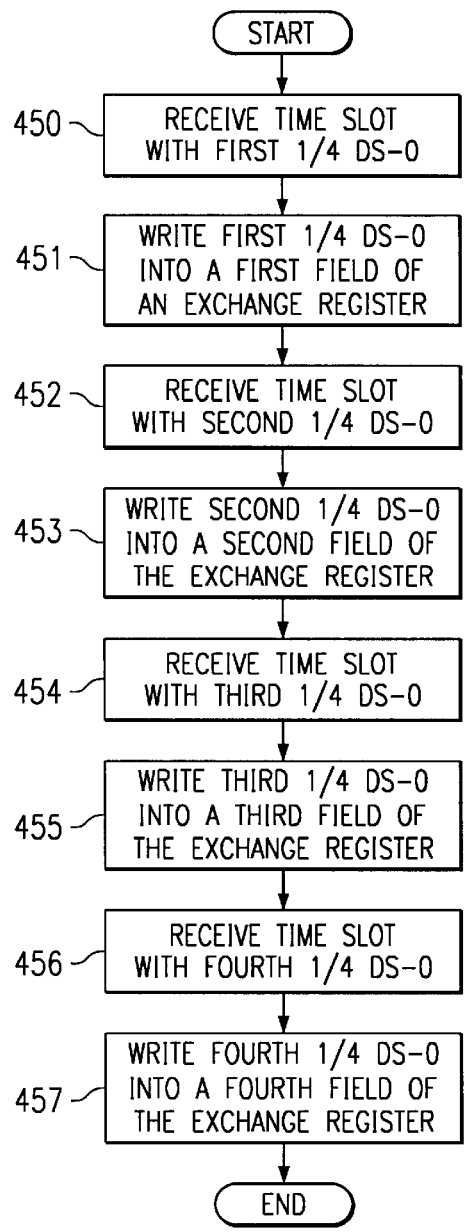
FIG. 21 is a flow diagram illustrating a method for consolidating ¼ DS-0 traffic in the TSI of FIG. 19 in accordance with one embodiment of the present invention.

FIG. 21 is a flow diagram illustrating a method for consolidating ¼ DS-0 traffic within the TSI 64 in accordance with one embodiment of the present invention. In this embodiment, ¼ DS-0s are consolidated into a combined, or composite, DS-0 channel in the exchange registers 422. The ¼ DS-0s are written to arbitrary locations in the combined DS-0 channel as specified by the write address of the instruction word. It will be understood that ¼ DS-0s and other suitable types of sub-channels may be otherwise suitably consolidated without departing from the scope of the present invention.

Referring to FIG. 21, the method begins at step 450 in which a time slot, or octet, with a first ¼ DS-0 is received. At step 451, the first ¼ DS-0 is written into a first field of an exchange register. Next, at step 452, a time slot with a second ¼ DS-0 is received by the TSI 64. At step 453, the second ¼ DS-0 is written into a second field of the exchange register. Proceeding to step 454, a time slot with a third ¼ DS-0 is received. At step 455, the third ¼ DS-0 is written into a third field of the exchange register. Next, at step 456, a time slot with a fourth ¼ DS-0 is received. At step 457, the fourth ¼ DS-0 is written into a fourth field of the exchange register. Step 457 leads to the end of the process by which ¼ DS0-traffic is consolidated into a single channel within the TSI 64. The consolidated DS-0 may then be read and routed as a single DS-0.

Figure 22:
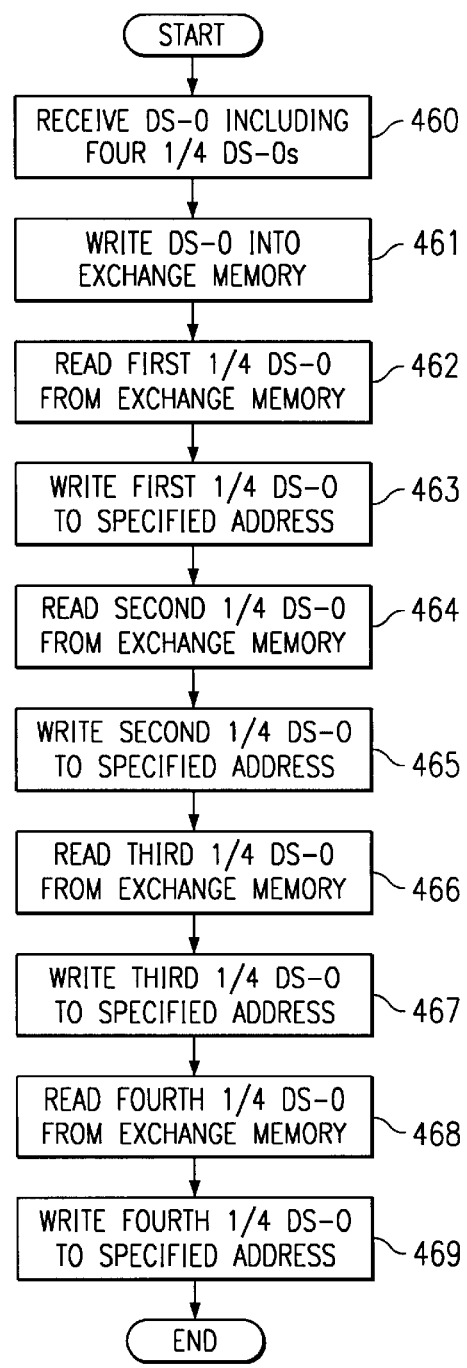
FIG. 22 is a flow diagram illustrating a method for expanding ¼ DS-0 traffic in the TSI of FIG. 19 in accordance with one embodiment of the present invention.

FIG. 22 is a flow diagram illustrating a method for expanding ¼ DS-0 traffic within the TSI 64 in accordance with one embodiment of the present invention. In this embodiment, the ¼ DS-0s may be expanded using exchange RAM and/or the exchange register banks. The expanded ¼ DS-0s are written to the least significant nibble of a DS-0. It will be understood that the expanded ¼ DS-0s may be otherwise written to separate DS-0s and that other types of sub-channels may be similarly expanded without departing from the scope of the present invention.

Referring to FIG. 22, the method begins at step 460 in which a DS-0 including four discrete ¼ DS-0s is received by the TSI 64. At step 461, the DS-0 is written into exchange memory, which may be either in the exchange register bank or the exchange RAM.

Next, at step 462, a first ¼ DS-0 is read from the exchange memory. At step 463, the first ¼ DS-0 is written to a specified address based on the instruction word. This specified address may be an egress time slot or another memory slot. At step 464, a second ¼ DS-0 is read from the exchange memory. At step 465, the second ¼ DS-0 is written to a specified address based on the instruction word.

Proceeding to step 466, the third ¼ DS-0 is read from the exchange memory. At step 467, the third ¼ DS-0 is written to a specified address based on the instruction word. At step 468, the fourth ¼ DS-0 is read from the exchange memory. At step 469, the fourth ¼ DS-0 is written to a specified address based on the instruction word. As previously described, the specified address may be an egress time slot or another memory channel. Step 469 leads to the end of the process by which ¼ DS-0s are expanded from a shared channel into disparate time or memory slots for separate routing.

Figure 23:
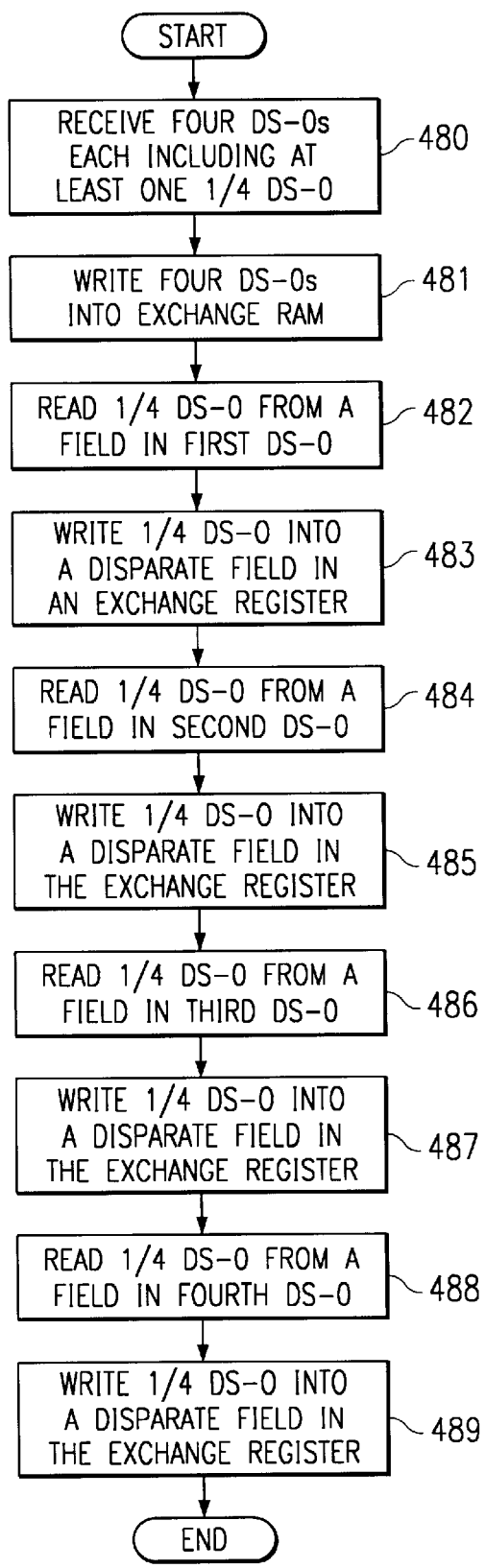
FIG. 23 is a flow diagram illustrating a method for switching ¼ DS-0 traffic in the TSI of FIG. 19 in accordance with one embodiment of the present invention.

FIG. 23 illustrates a flow diagram for switching ¼ DS-0s in accordance with one embodiment of the present invention. In this embodiment, the ¼ DS-0s are switched by transfers between the exchange RAM and the exchange registers. It will be understood that ¼ DS-0s and other types of sub-channels may be otherwise suitably switched within a single or different memories without departing from the scope of the present invention.

Referring to FIG. 23, the method begins at step 480 in which four DS-0s each including at least one ¼ DS-0 is received by the TSI 64. At step 481, the four DS-0s are written into the exchange RAM by the TSI 64. Next, at step 482, a ¼ DS-0 is read from a field in the first DS-0. At step 483, the ¼ DS-0 is written into a disparate field in an exchange register. At step 484, a ¼ DS-0 is read from a field in the second DS-0. The ¼ DS-0 is then written into a disparate field in the exchange register.

Proceeding to step 486, a ¼ DS-0 is read from a field in the third DS-0. At step 487, the ¼ DS-0 is written into a disparate field in the exchange register. At step 488, a ¼ DS-0 is read from a field in the fourth DS-0. At step 489, the ¼ DS-0 is written into a disparate field in the exchange register. Step 489 leads to the end of the process by which the ¼ DS-0s are each switched between fields, or nibbles, in switch memory.

In addition to consolidating, expanding, and switching traffic, the TSI 64 may also modify data in a stored channel. In this case, the value for the channel is read from memory, modified based on arithmetic or logic operations, and written back to the same or a different memory slot. In this way, the value may be incremented, decremented, or otherwise suitably modified. The slot based operations may be stored in the instruction ram 424 and provided to the TSI 64 in an extension of the instruction word. In addition, the TSI 64 may be used to examine data values and make decisions and/or perform specified operations based on the value. The specified operations may alter routing of the traffic channel and/or of other traffic channels. In this way, time slot based digital signal processing (DSP) is provided for DS-0s, ¼ DS-0s, and other suitable traffic. For example, traffic from one or more connections may be merged in the TSI 64 based on instructions to form a conference call involving a plurality of parties.

FIGS. 24–28 illustrate details of the structure and operation of the multi-purpose ATM switch 66 in accordance with one embodiment of the present invention. In this embodiment, the multi-purpose ATM switch 66 is a single circuit that incorporates ATM switching, SAR functionality, and IMA processing in a shared block of logic and memory. This provides implementation compactness and associated cost savings as well as a richer feature set within a single ATM switch card. In addition, SAR and IMA functionality are off loaded from the line cards 40 to the switch core 44 which increases port space available on the line cards 40 while reducing cost.

Referring to FIG. 24, the multi-purpose ATM switch 66 includes a shared switch memory 500, a common switch controller for 502, and a header look up table 504. The switch memory 500 includes a number of queues 506 each associated with a line card output port 48. As described in more detail below, a dedicated queue 506 is provided for each IMA connection and AAL connection processed by the multi-purpose ATM switch 66. Traffic for each connection is stored in the dedicated queue 506 by the common switch controller 502. On the output side of the multi-purpose ATM switch 66, a scheduler determines which queue 506 is operated at any given time.

The switch controller 502 extracts a sourced interface and VPI/VCI value for each traffic cell and uses that information to access the header look up table 504 to determine whether the cell should be switched, AAL1 SARed or re-ordered as part of an IMA stream. The source interface and VPI/VCI values also indicate the queue 506 to be used in performing the indicated operation. It will be understood that the switch controller 502 may use other information to identify cells for IMA and AAL connections and to determine queues 506 for storing traffic cells for those connections.

The common switch controller 502 includes a queue controller 508 and an IMA counter 510. The queue controller 508 receives traffic cells from the line cards 40 and queues the traffic cells in the switch memory 500 based on their type. In particular, IMA cells are stored in order of transmission in a dedicated queue 506. AAL cells are also stored in order of their transmission in a dedicated queue 506. ATM cells are stored in one or more queues associated with output ports 48 for the cells.

The IMA counter 510 provides an incrementing count value for cells of an IMA stream. As described in more detail below, an incremental count value is provided for each successive cell of an IMA stream to indicate the relative order of the cells at a destination node. The count value may be transmitted within the cell or may be prepended to a cell and transmitted within a time slot for the cell. It will be understood that the order indicator may be any of the suitable type of indicator operable to allow a destination node to re-order cells of an IMA stream.

FIG. 25 illustrates transmission of an IMA stream over multiple T1 links of a network. IMA provides an aggregate bandwidth greater than a single T1 link (1.544 Mb/s) but less than a OS-3 link. Traffic cells for the IMA stream are demultiplexed at a source node 520 for transmission over a plurality of T1 links 522. During transmission, the IMA cells become mis-ordered due to different cell rates, latencies, and jitter in the T1 links. At a destination node 524, the IMA cells are recovered and re-ordered to recover the IMA stream.

FIG. 26 is a flow diagram illustrating a method for transmitting and recovering cells for an IMA stream in accordance with one embodiment of the present invention. In this embodiment, an incrementing count value is overwritten into the upper bits of the VPI field for each cell and transmitted in-band with the cell. It will be understood that the count value may be otherwise inserted into a cell or prepended to a cell for transmission with the cell to a destination node.

Referring to FIG. 26, the method begins at step 540 in which ATM cells for an IMA stream are stored in a single queue 506 at the source node 520. Next, at step 542, the ATM cells are extracted from the dedicated queue 506 in an order of transmission. At step 544, an incrementing count value generated by the IMA counter 510 is inserted into the upper bits of the VPI of each ATM cell as it is extracted from the queue 506.

Proceeding to step 546, the ATM cells are transmitted on available Ti interfaces. At step 548, the ATM cells are received by one or more line cards 40 at the destination node 524. At step 550, the line cards 40 pass the ATM cells to the multi-purpose ATM switch 66. At step 452, the multi-purpose ATM switch 66 identifies the ATM cells as being associated with the. IMA stream. As previously described, the multi-purpose ATM switch 66 may identify the cells as being associated with the IMA stream based on the source interface and VPI/VCI values in the cell header.

Next, at step 554, the queue controller 508 queues the ATM cells for the IMA stream into a dedicated queue 506 based on their count value. Accordingly the IMA stream is reconstituted in the dedicated queue 508. At step 556, the multi-purpose ATM switch 66 switches the reconstituted IMA stream in accordance with its address information. Step 556 leads to the end of the process by which IMA traffic is transmitted and recovered using in-band contrary information. As a result, overhead cells need not be transmitted or processed by the source and destination nodes which reduces processing requirements and optimizes bandwidth usage over the network.

FIG. 27 is a flow diagram illustrating a method for transmitting and recovering cells for an AAL stream in accordance with one embodiment of the present invention. In this embodiment, a portion of the CAS values for the AAL cells are included in each cell of DS-0s as previously described in connection with the transport of telephony traffic on the HSA bus 72. In particular, a small number of CAS values are carried in every frame. These CAS values are successively associated with different DS-0s in the frame, with the DS-0s changing each frame period. The number of the frame within the super frame explicitly determines the DS-0s with which each CAS value is associated and provides an order indicator for the AAL cells.

Referring to FIG. 27, the method begins at step 570 in which DS-0 traffic for a connection is segmented into AAL cells for transmission over a network. The bus fuser 350 generates the AAL cells by reading the DS-0 and CAS values from the exchange RAM. At step 572, the sequence count 300 is generated by the bus fuser 350 as it is assembling the DS-0s and CAS values into the cell. A modulo 16 counter is used to generate the sequence count 300 for the AAL cells. The sequence count 300 provides an incrementing count value for the AAL cells and in accordance with the scheme of FIG. 14 that identifies the CAS values to be transported in the AAL cells. The cells are then passed to the multi-purpose ATM switch 66 and queued for transmission. At step 574, the AAL cells are transmitted on the network to a destination node.

Proceeding to step 576, the AAL cells are received with other ATM traffic at one or more line cards 40 of a destination node. At step 578, the ATM traffic is passed to the multi-purpose ATM switch 66. At step 580, the multi-purpose ATM switch 66 identifies the AAL cells for the connection. As previously described, this may be done by extracting and using a source indicator and the VPI/VCI value for the cells.

Next, at step 582, the queue controller 508 queues the AAL cells for the connection in a dedicated queue 506 based on the count value. At decisional step 584, the switch controller 502 determines whether any AAL cells were lost during transmission by determining whether a count value is absent from the dedicated queue 506. If none of the AAL cells were lost, the No branch of the decisional step 584 leads to step 586 where the multi-purpose ATM switch 66 switches the AAL cells. Next, at step 588, the multipurpose ATM switch 66 de-jitters the AAL cells. At step 590, the ATM switch 66 reassembles the DS-0 traffic from the AAL cells for delivery to customer interfaces through the TSI 64 by the TTSP. Returning to decisional step 584, if one or more AAL cells are lost during transmission, the Yes branch of decisional step 584 leads to step 592 in which an error is indicated by the multi-purpose ATM switch 66. Steps 590 and 592 each lead to the end of the process by which AAL cell payloads are transmitted to customer interfaces.

FIG. 28 is a flow diagram illustrating a method for processing ATM traffic at the multi-purpose ATM switch 66. The method begins at step 600 in which ATM traffic is received at one or more line cards 40 of a telecommunications node. At step 602, the traffic is passed to the multi-purpose ATM switch 66. Next, at step 604, the ATM switch 66 determines an output queue 506 for each ATM cell. The output queue 506 is associated with an output port 48 over which the ATM cell will be transmitted to a destination node. The output queue 506 may be determined from the header look up table 504 based on the source indicator and VPI/VCI value for the cell.

Proceeding to step 606, the queue controller 508 queues the ATM cells into the indicated output queues in a first-in-first out (FIFO) order. Next, at step 608 the ATM cells are transmitted to the output ports 48 for transmission over the network in the order in which they are queued. Step 608 leads to the end of the process by which ATM traffic is processed by the multi-purpose ATM switch 66.

FIGS. 29–34 illustrate details of the structure and operation of the high capacity ATM switch 68 in accordance with one embodiment of the present invention. In this embodiment, the high capacity ATM switch 68 uses a common data path and memory to switch both ATM and TDM traffic. As a result, switching hardware is reduced and line cards 40 communicating with the switch 68 may include a mix of both ATM and TDM traffic.

Figure 29:
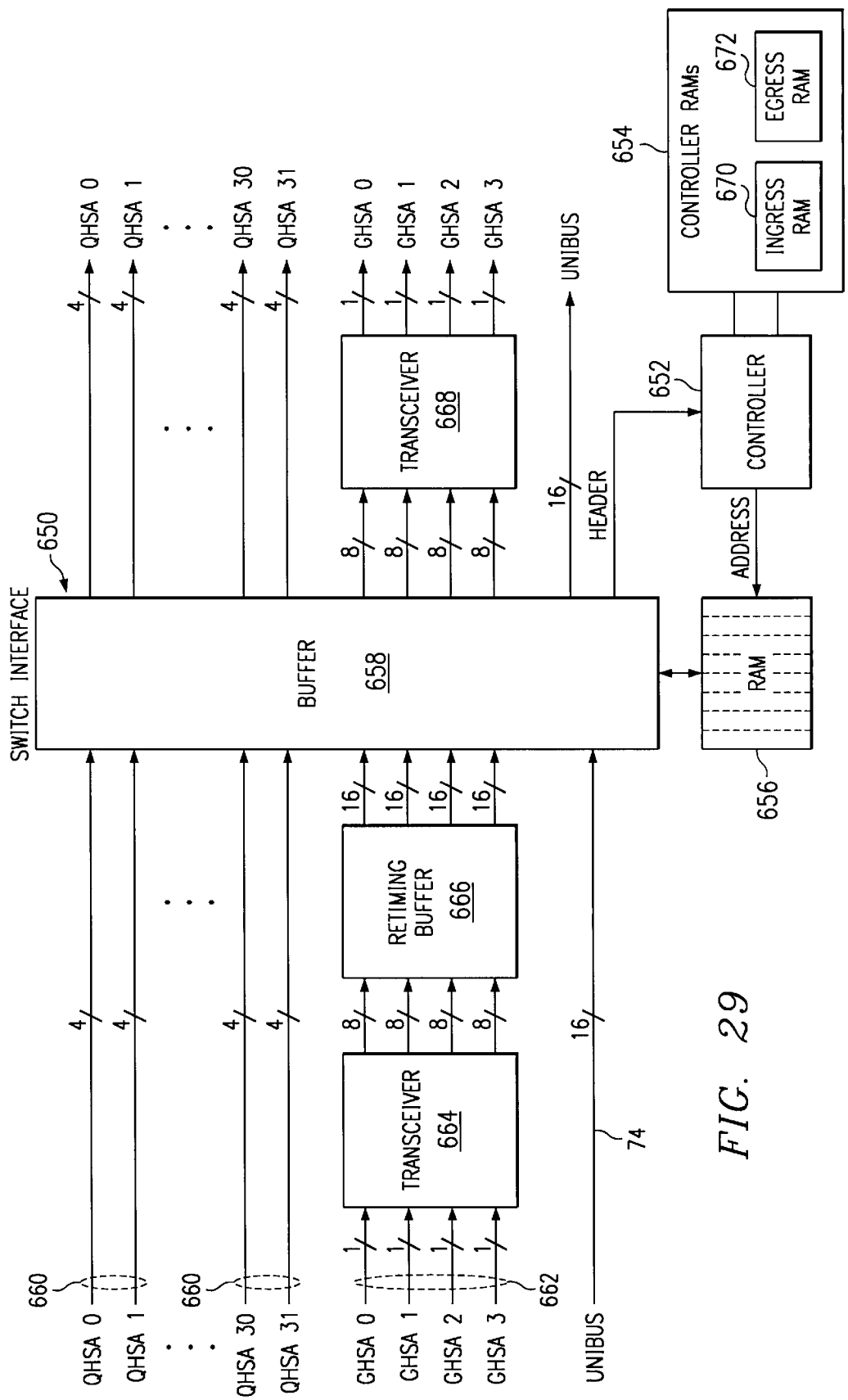
FIG. 29 is a block diagram illustrating details of the high capacity ATM switch card of FIG. 17 in accordance with one embodiment of the present invention.

Referring to FIG. 29, the high capacity ATM switch 68 includes a switch interface by 650, a controller 652, control RAMs 654, and central RAM, or switching memory, 656. The switch interface 650 de-serializes the ingress cells arriving from the line cards 40 to allow the cells to be written to the switching memory 656 in a single cycle. Switch interface 650 reads egress cells from the switching memory 656 in a single cycle and serializes the cells for distribution back to the line cards 40. The switch interface 650 also extracts and passes CID and other suitable header information to the controller 652.

The switch interface 650 forms the data path of the switch 68 and performs the de-serializing and serializing functions. The switch interface 650 may utilize external retiming functions for the bus interfaces. In a particular embodiment, the switch interface 650 directly terminates 14 QHSA links 660. The QHSA links 660 are each a point-to-point HSA link 78 operating at 64 cells per frame. The QHSA links 660 each support physical interface with rates up to 217 Mb/s. The switch interface 650 further terminates four GSA links 562 through a transceiver 664 and a retiming buffer 666 and transmits on the GSA links 662 through a transceiver 668. The GSA links 662 are each a point-to-point HSA link 78 operating at 256 cells per frame. Each GSA link 662 supports physical interfaces with rates up to 1 Gb/s. The GSA links 662 are each a one byte data path.

The transceiver 664 serializes the QHSA strings into an eight bit 133 MHZ format. The eight bit wide interfaces pass cells through the retiming buffer 666. The retiming buffer 666 retimes and widens the data path to sixteen bits at 66 MHZ, which is a frequency of the high capacity ATM switch 68. From the transmit side, the transceiver 668 parallelizes the eight bit 133 MHZ stream into a one bit stream for transmission to the line cards 40.

The switch interface 650 also interfaces with the unibus 74. The unibus 74 is a 16 bit link operating at 66 MHZ. As previously described, the unibus 74 is a HSA bus and transport traffic between the fused TDM/ATM switch card 60 and the high capacity ATM switch 62. The unibus 74 operates at 256 cells per frame. It will be understood that the switch interface may be implemented in a single buffer or in a plurality of discrete buffers.

The controller 652 receives the header extracted from each cell by the switch interface 650. Based on the CID in the header, the controller 652 determines whether the cell is a TDM cell or an ATM cell and provides an address to the switching memory 656 for storing the cell. In particular, for TDM cells, the controller 652 generates an address based on the line card 40 and HSA slot number of the cell. For ingress ATM cells, the controller 652 access an ingress RAM 670 in the controller RAM 654 to determine a queue for storing the cell. In the egress direction, the controller 652 accesses an egress RAM 672 in the controller RAM 654 to determine which ATM queue is to be read into a given slot and, if a slot is a TDM slot, which address from which to read the TDM cell. In each case, the controller 652 determines and provides an address to the switching 656 which is used when the switch interface writes to or reads from the memory 656.

The switching 656 interfaces with the switch interfaces 658 to receive traffic cells and with the controller 652 to receive addresses for storing the traffic cells. In one embodiment, each of the transmit buffers 658 interface to a slice of the switching memory 656. In this embodiment, the transmission buffers 658 are synchronized to all read and write to their slice of memory at the same time. A slice of the switching 656 includes two synchronized RAMs. In a particular embodiment, the switching memory 656 comprises eight 133 MHZ RAM I/O. In this embodiment, each of the eight RAMs comprises at 128Kx=byte or 256Kx32 byte sync-burst RAM. Individual RAMs that make up the central RAM 556 may be distributed on the high capacity ATM switch card 62.

FIG. 30 illustrates details of the controller 652 in accordance with one embodiment of the present invention. In this embodiment, the controller 652 comprises a transmission buffer interface 680, a header translator 682, a queue manager 684, a pointer memory 686 and a multicast manager 688. The transmission buffer interface 680 communicates with the transmission buffers 658 to receive header information pass the header information to header translation 682. Header translation 682 determines whether cells are TDM or ATM cells based on the extracted header, generates an address for storing TDM cells based on their header, and accesses ingress RAM 670 to determine target queues for storing ATM cells.

The queue manager 684 administers the read/write pointer for each queue in the switching 656. The queue manager 684 constructs switching memory addresses required during each subframe using a combination of cell pointer and base address associated with each queue. For ingress ATM cells, the target queue is passed to the queue manager 684 which uses the target queue number to index a pointer and base address array, from which the queue manager 684 constructs an address into switching memory 656. For egress cells, the queue manager 684 indexes the egress RAM 672 which provisions each slot for the HSA bus 72 and the unibus 74. For TDM traffic, the provisioning consists of an address in the exchange. RA portion of the switching memory 656.

The multicast manager 688 uses header information provided to the controller 652 to identify multicast cells and indicate the cells should be written to a multicast queue at the next read address location. In addition, the multicast manager 658 determines a multicast count of the number of ports at which the multicast cell is targeted and determines which ports are targeted.

In operation, the switch interface 650, controller 652, and switching memory 656 operate based on a repeating of 256 subframes residing within 125 microsecond frames. The first half of each subframe is used to read from switching memory 656 and the second half is used to write to switching memory 656. In this embodiment, a memory interface arbitrates access to the switching memory 656 between ingress and egress traffic. Each type of traffic is temporarily buffered on its way into and out of the switching memory 656. Access to the switching memory 656 is performed in accordance with a deterministic pattern. FIG. 31 illustrates details of the switching 656 in accordance with one embodiment of the present invention. In this embodiment, the switching memory 656 is divided into an ATM traffic section 690 and a TDM traffic section 690. The ATM traffic section 690 comprises 52K cells (128Kx256 switching memory) and the TDM traffic section 692 comprises 12K cells. A microprocessor section 694 is provided for use by the microprocessor operating the switch card 62.

To allow the high capacity ATM switch 68 to time slot interchange traffic between all HSA links, including the unibus 74, the TDM traffic section 692 includes a 3-stage exchange RAM 696 with enough memory to hold the entire cell bandwidth of the egress links. During any one frame, one stage 696 is written to, one stage 696 is read from, and the third stage 696 acts as a read-to-write (and vise-a-versa) crossover buffer. The crossover buffer compensates for differences in buffering delays and frame misalignments along the multiple data paths entering and exiting the transmission buffers 658. The stages 696 swap roles on successive frames, resulting in a two-frame latency for slot interchange, but no jitter.

FIG. 32 illustrates a deterministic pattern for accessing the switching memory 656 in accordance with one embodiment of the present invention. In this embodiment, each 125 microsecond frame period is divided into 256 subframes, each of which includes 64 cycles. The switch and line cards are synchronized to this 125 microsecond frame pulse which in turn is derived from the systems clock. This synchronization at this level minimizes the amount of interface logic required for the system. A repeated schedule of RAM accesses are performed each subframe consisting of 30 egress reads followed by 30 egress writes. As previously described, the controller 552 provides the base addresses prior to each read and write operation. The switching memory 652 then either performs a linear read or write burst transfer of the two words starting at that address.

Figure 33:
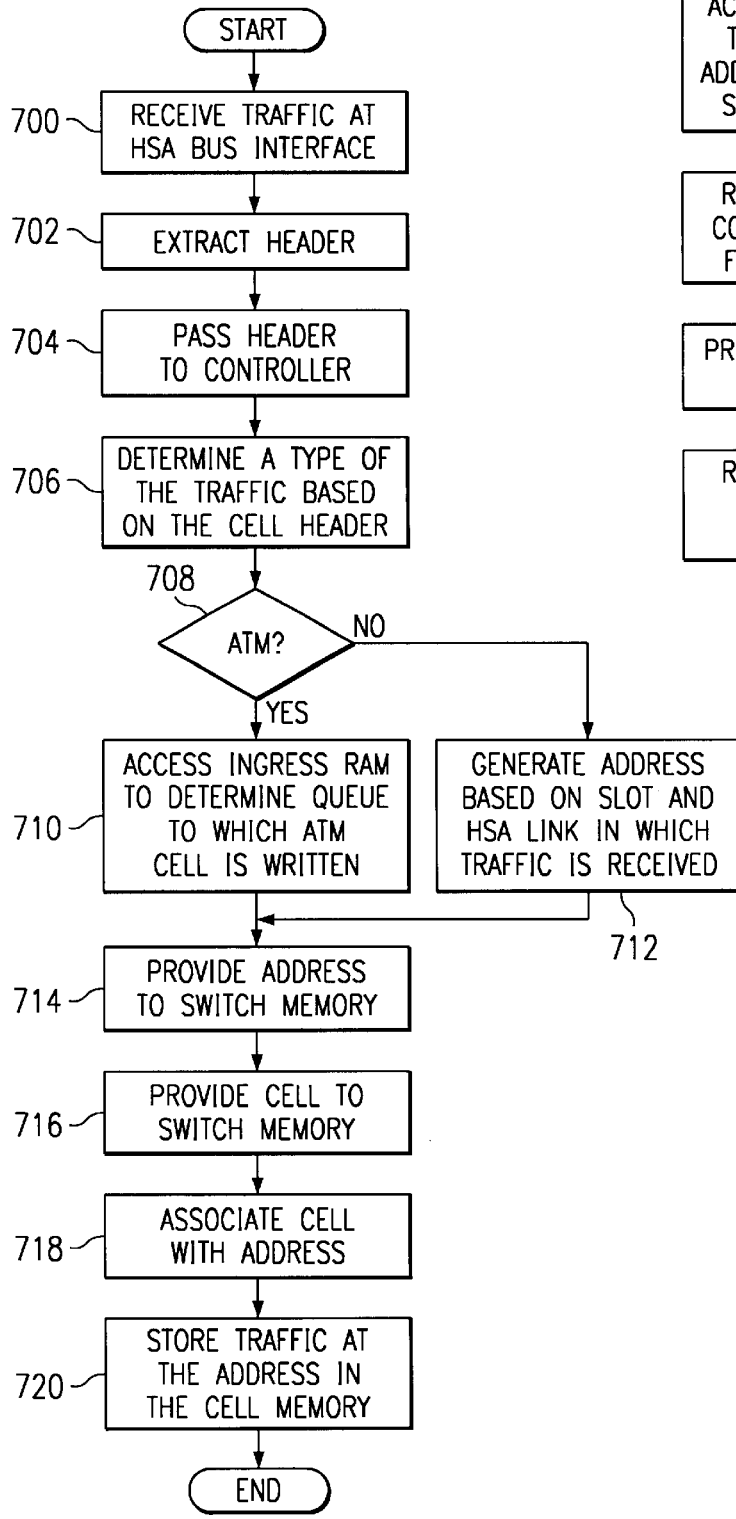
FIG. 33 is a flow diagram illustrating a method for processing ingress TDM and ATM traffic at the high capacity ATM switch of FIG. 29 in accordance with one embodiment of the present invention.

FIG. 33 is a flow diagram illustrating a method for processing ingress TDM and ATM traffic using a common data path in accordance with one embodiment of the present invention. In this embodiment, the method begins at step 700 in which traffic is received at the switch interface 650. As previously described, the traffic may be directly received at the switch interface 650 for the QHSA links 660 and the unibus 74 or received through the transceiver 664 and retime buffer 666 for the GHSA links 662.

Next, at step 702, the switch interface 650 extracts a header from each traffic cell. As previously described, the header for HSA traffic includes a cell type and a CID value provided by the line cards 40. At step 704, the header is passed to the controller 652.

Proceeding to step 706, the controller 652 determines a type of a cell based on the cell header. At decisional step 708, if the cell is an ATM cell, the Yes branch proceeds to step 710. At step 710, the controller 652 accesses the ingress RAM 670 to determine an address of a target queue to which the ATM cell is to be written. Returning to decisional step 708, if the cell is not an ATM cell, then the No branch of decisional step 708 leads to step 712 in which the controller 652 generates an address for the TDM cell based on the line card and HSA slot number from which the TDM cell is received. Steps 710 and 712 each lead to step 714.

At step 714, the controller 552 provides the address to the switch memory 656. At step 716, the switch interface 650 provides the cell to the switch memory 656 for storage. At step 718, an interface for the switch memory 656 associates the cell with the address. The cell and address may be synchronously provided by the switch interface 650 and controller 652. At steps 720, the switch memory 656 stores the cell at the address. Step 720 leads to the end of the process by which TDM and ATM traffic are processed and stored utilizing a single data path.

Figure 34:
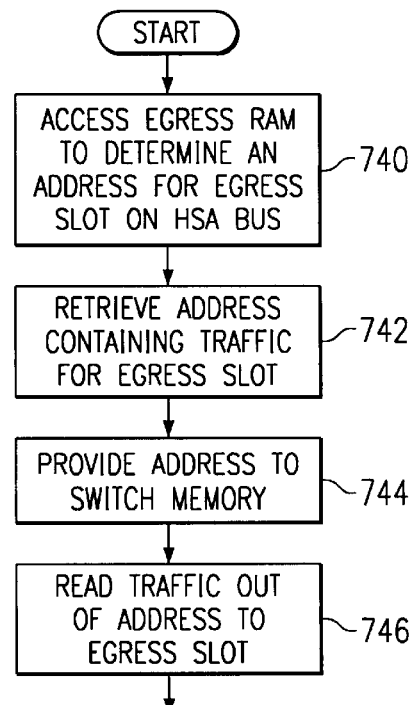
FIG. 34 is a flow diagram illustrating a method for processing egress TDM and ATM traffic at the high capacity ATM switch of FIG. 29 in accordance with one embodiment of the present invention.

FIG. 34 is a flow diagram illustrating a method for processing egress TDM and ATM traffic using common data path in accordance with one embodiment of the present invention. In this embodiment, the method begins at step 740 in which the controller 652 accesses the egress RAM 672 to determine an address in the switching memory 656 containing a cell to be transmitted in a next egress slot on the HSA bus including the unibus 74. Next, at step 742, the controller 652 retrieves the address containing traffic to be read into the egress slot. If the traffic is ATM traffic, the address will be that of an ATM queue containing the ATM cell. If the traffic is a TDM cell, the address will be that in that TDM portion 692 of the switching memory 656.

Proceeding to step 744, the controller 652 provides the address to the switch memory 656. At step 746, the switch memory 656 reads traffic out of the address to the switch interface 650. At step 748, the switch interface 650 inserts the traffic into the egress slot for transmission on the HSA bus. Step 748 leads to the end of the process by which TDM and ATM traffic are processed and switched using a single data path. The dual functionality of the switch data path reduces switching hardware in the switch core 44. As a result, the cost of the switch core 44 and the network element are reduced.

Although the present invention has been described with several embodiments, various changes and modifications may be suggested to one skilled in the art. It is intended that the present invention encompass such changes and modifications as fall within the scope of the appended claims.

What is claimed is:

1. A rate adjustable backplane, comprising:
   a set of switch slots configured to receive one or more switch cards forming a switch core;
   a plurality of line slots each configured to receive a line card;
   a low speed bus coupling the line slots to the set of switch slots;
   a high speed bus coupling the line slots to the set of switch slots;
   each line slot including a low speed connector coupled to the low speed bus and adapted to receive a mating connector of a line card to establish a low speed communication connection between the line card and the switch core and a high speed connector coupled to the high speed bus and adapted to receive a mating connector of a line card to establish a high speed communication between the line card and the switch core;
   the high speed bus further comprising a plurality of discrete point-to-point links coupling each line slot to the set of switch slots;
   a first portion of the point-to-point links for the high speed bus preconfigured to operate at a first high rate; and
   a second portion of the point-to-point links for the high speed bus preconfigured to operate a second high rate.

2. The rate adjustable backplane of claim 1, the low speed bus comprising a time division multiplex (TDM) bus and the high speed bus comprising an asynchronous transfer mode (ATM) bus.

3. The rate adjustable backplane of claim 1, the low speed bus further comprising a discrete point-to-point link coupling each line slot to the set of switch slots.

4. The rate adjustable backplane of claim 1, further comprising:
   the low speed bus comprising a discrete point-to-point link coupling each line slot to the set of switch slots.

5. The rate adjustable backplane of claim 1, further comprising at least one point-to-point link of the high speed bus adaptable in connection with a line card to operate at a plurality of high rates.

6. A rate adjustable backplane, comprising:
   a first switch slot configured to receive a multiple format switch card;
   a second switch slot configured to receive a higher-capacity cell based switch card;
   a plurality of line slots each configured to receive a line card;
   a first speed synchronous bus coupling the line slots to the first switch slot;
   a second higher speed cell bus coupling the line slots to the second switch slot;
   each line slot including a first speed connector coupled to the first speed synchronous bus and adapted to receive a mating connector of a line card to establish a first speed connection between the line card and the multiple format switch card in the first switch slot and including a second higher speed connector coupled to the second higher speed cell bus and adapted to receive a mating connector of a line card to establish a second higher speed connection between the line card and the higher-capacity cell based switch card in the second switch slot;
   a unibus coupling the multiple format switch card in the first switch slot to the higher capacity cell based switch card in the second switch slot;
   a plurality of line cards each disposed in one of the line slots, a first portion of the line cards communicating with the multiple format switch card over the first speed synchronous bus and a second portion of the line cards communicating with the higher capacity cell based switch card over the second higher speed cell bus; and
   further comprising at least one line card operable to communicate with the second higher capacity cell based switch card over the first speed synchronous bus to determine a rate at which to operate a point-to-point link on the second higher speed cell bus between the line card and the higher capacity cell switch card and to operate the link of the second higher speed cell bus at the rate.

7. The telecommunications node of claim 6, the multiple format switch card comprising a TDM and an ATM switch exchanging traffic across a common switch memory, the first speed synchronous bus comprising a time division multiplex bus, the higher capacity cell based switch card comprising an ATM switch, and the second higher speed cell bus comprising an ATM bus.

8. A line card for a telecommunications node comprising:
   a first speed connector configure to mate with a corresponding connector of a first speed bus on a backplane of a telecommunications node;

a second higher speed connector configure to mate with a corresponding connector of a point-to-point link of a second higher speed bus on the backplane of the telecommunications node; and the line card operable to communicate with a switch core of the telecommunications node over the first speed bus to determine a rate to operate the second higher speed bus and to operate the point-to-point link of the second higher speed bus at the rate for communication with the switch core.

9. The line card of claim 8, wherein the first speed connector is configured to mate with a corresponding connector of a time division multiplex (TDM) bus and the second higher speed connector is configured to mate with a corresponding connector of a point-to-point link of an asynchronous transfer mode (ATM) bus.

10. The line card of claim 8, the first speed connector configured to mate with a corresponding connector of a point-to-point link of the first speed bus.

11. A method for establishing a high speed communication link between a line card and a switch core over a backplane of a telecommunications node, comprising:

establishing a communication connection between a line card and a switch core over a first speed bus operating at a predefined rate;

determining over the communication connection a rate at which to operate a point-to-point link of a second higher speed bus coupling the line card to the switch core; and operating the point-to-point link of the second higher speed bus at the rate to communicate traffic between the line card and the switch core.

12. The method of claim 11, wherein the first speed bus comprises a point-to-point link between the switch core and the line card.

13. The method of claim 11, wherein the first speed bus comprises a time division multiplex (TDM) bus.

14. The method of claim 11, wherein the second higher speed bus comprises a cell based bus.

15. The method of claim 11, further comprising synchronizing operation of the point-to-point link of the second higher speed bus to that of the point-to-point link of the first speed bus.

16. A system for establishing a high speed communication link between a line card and a switch core over a backplane of a telecommunications node, comprising:

a computer-readable medium; and software stored on the computer-readable medium, the software operable to establish a communication connection between a line card and a switch core over a first speed bus operating at a predefined rate, to determine over the communication connection a rate at which to operate a point-to-point link of a second higher speed bus coupling the line card to the switch core, and to operate the point-to-point link of the second higher speed bus at the rate to communicate traffic between the line card and the switch core.

17. The system of claim 16, wherein the first speed bus comprises a point-to-point link between the switch core and the line card.

18. The system of claim 16, wherein the first speed bus comprises a time division multiplex (TDM) bus.

19. The system of claim 16, wherein the second higher speed bus comprises a cell based bus.

20. The system of claim 16, the software further operable to operate the point-to-point link of the second higher speed bus in synchronization with the point-to-point link of the first speed bus.

* * * * *